United States Patent
Ozawa

(10) Patent No.: US 7,992,084 B2
(45) Date of Patent: Aug. 2, 2011

(54) DOCUMENT MANAGEMENT APPARATUS, DOCUMENT MANAGEMENT METHOD, DOCUMENT MANAGEMENT PROGRAM, AND STORAGE MEDIUM

(75) Inventor: Shuuji Ozawa, Hino (JP)

(73) Assignee: Canon Kabushiki Kaisha, Tokyo (JP)

( * ) Notice: Subject to any disclaimer, the term of this patent is extended or adjusted under 35 U.S.C. 154(b) by 755 days.

(21) Appl. No.: 11/914,569

(22) PCT Filed: Aug. 11, 2006

(86) PCT No.: PCT/JP2006/316199
§ 371 (c)(1),
(2), (4) Date: Nov. 16, 2007

(87) PCT Pub. No.: WO2007/020987
PCT Pub. Date: Feb. 22, 2007

(65) Prior Publication Data
US 2009/0037486 A1 Feb. 5, 2009

(30) Foreign Application Priority Data
Aug. 12, 2005 (JP) .................................. 2005-234699

(51) Int. Cl.
*G06F 17/00* (2006.01)
*G06F 7/04* (2006.01)
(52) U.S. Cl. ........... 715/274; 715/255; 715/273; 726/26
(58) Field of Classification Search .................. 715/200, 715/202, 205, 234, 700, 204, 207, 226, 243, 715/255, 256, 273–275, 760, 761; 726/1, 726/2, 6, 22, 26
See application file for complete search history.

(56) References Cited

U.S. PATENT DOCUMENTS

| | | | | |
|---|---|---|---|---|
| 6,184,880 B1 * | 2/2001 | Okada | ........................... | 715/704 |
| 6,209,030 B1 * | 3/2001 | Ohashi | .......................... | 709/219 |
| 6,298,446 B1 * | 10/2001 | Schreiber et al. | ............... | 726/27 |
| 7,170,623 B2 * | 1/2007 | Matoba et al. | ............... | 358/1.15 |
| 2004/0064704 A1 * | 4/2004 | Rahman | ........................ | 713/200 |
| 2005/0033981 A1 * | 2/2005 | Tsurumaki | .................... | 713/200 |
| 2005/0105129 A1 * | 5/2005 | Takahashi | .................... | 358/1.15 |

FOREIGN PATENT DOCUMENTS

| | | |
|---|---|---|
| JP | 2002-084413 | 3/2002 |
| JP | 2002-288098 | 10/2002 |
| JP | 2005-165900 | 6/2005 |

OTHER PUBLICATIONS

Paint Stop Pro9 User Guide, Jasc Software, Inc. 2004, p. 74, p. 172, was cited in the International Search Report issue on Oct. 24, 2006.

* cited by examiner

*Primary Examiner* — Maikhanh Nguyen
(74) *Attorney, Agent, or Firm* — Cowan, Liebowitz & Latman, P.C.

(57) ABSTRACT

A document management apparatus that communicates with a server and manages confidentiality of electronic data generated by a confidentiality preservation program enables security management on data that is obtained with print screen function.

3 Claims, 20 Drawing Sheets

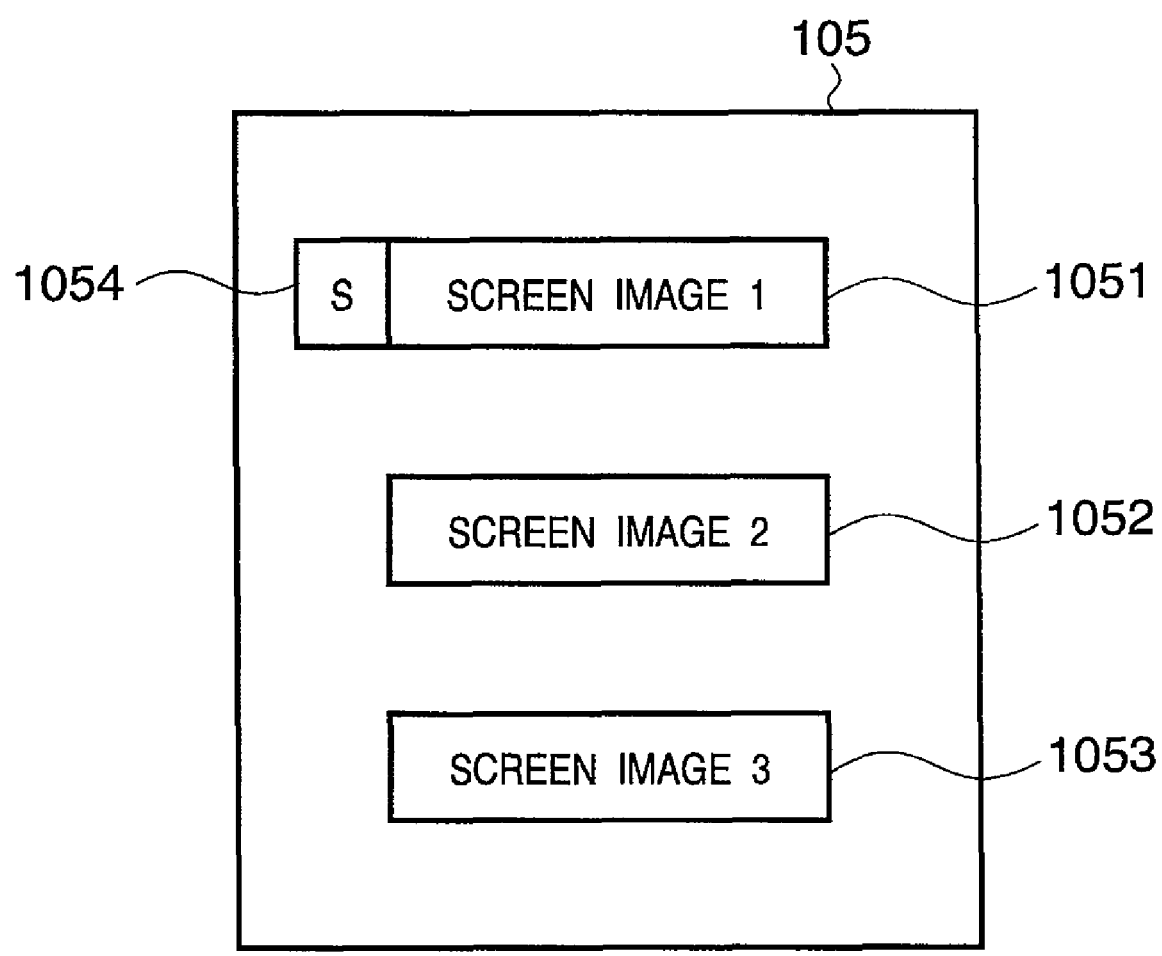

FIG. 6B

| APPLICATION NAME | ID | RUNNING / SUSPENDED | SECURED APPLICATION |
|---|---|---|---|
| A | 1 | RUNNING | S |
| B | 2 | SUSPENDED | S |
| C | 3 | SUSPENDED | — |
| D | 4 | SUSPENDED | — |

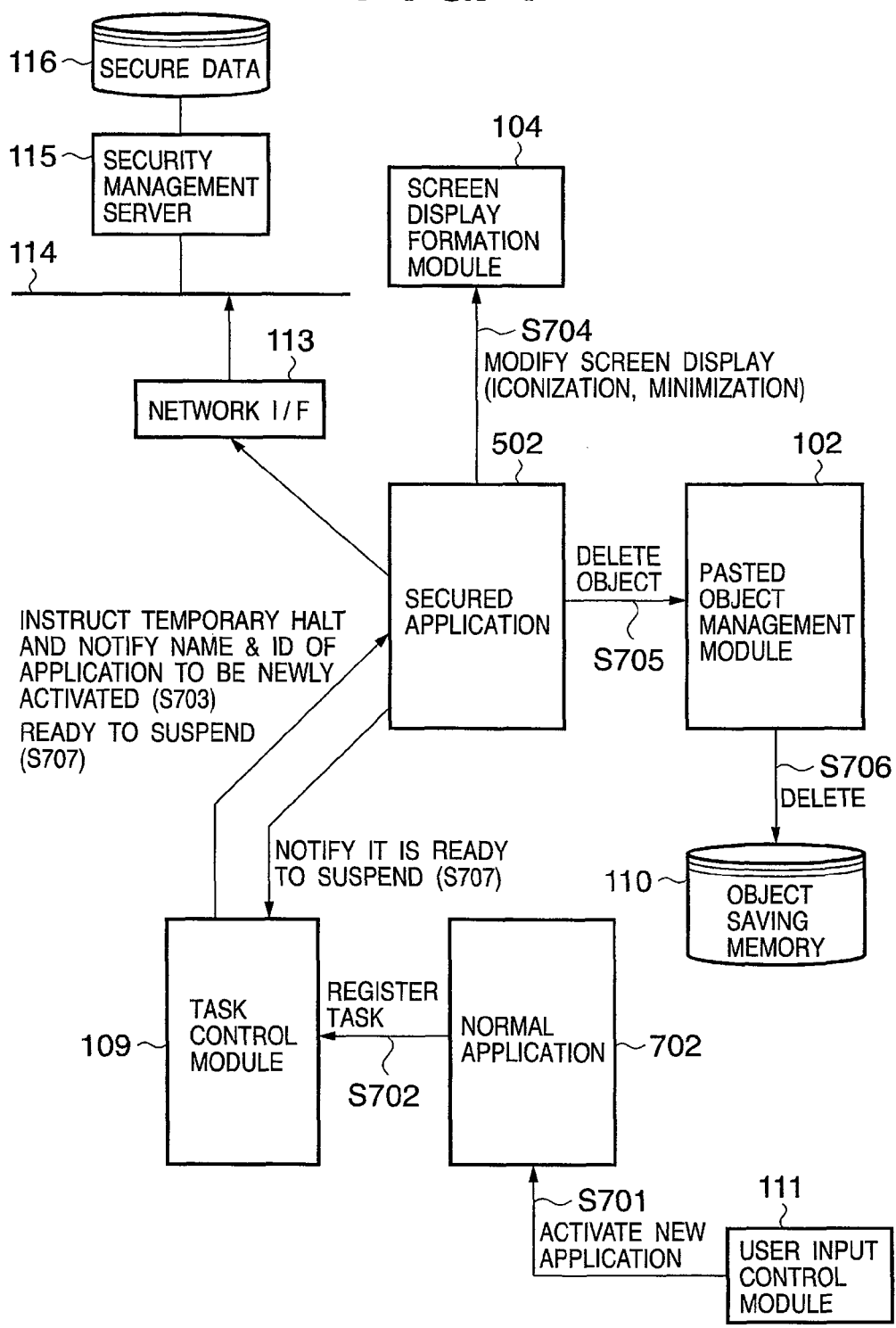

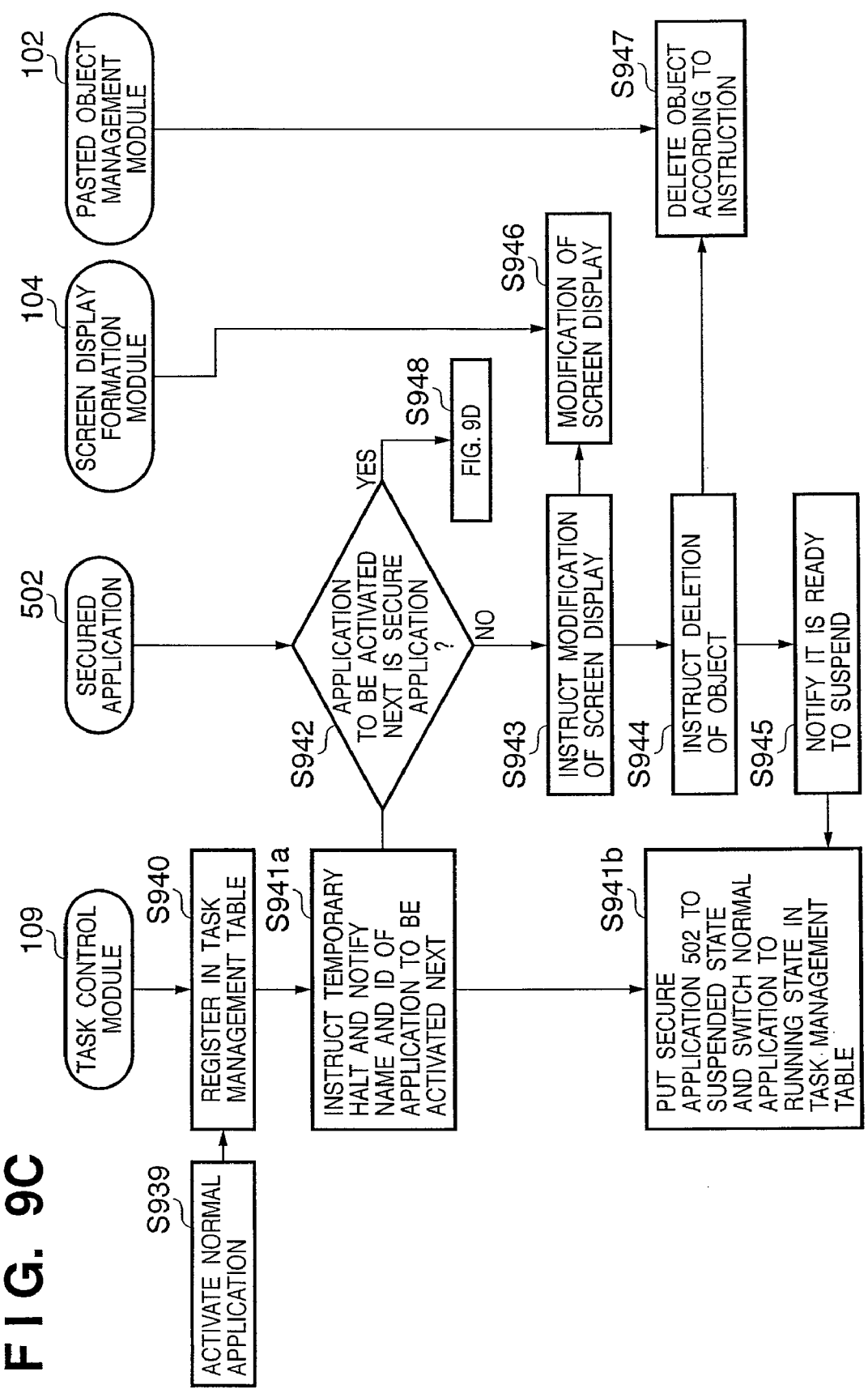

DOCUMENT MANAGEMENT APPARATUS, DOCUMENT MANAGEMENT METHOD, DOCUMENT MANAGEMENT PROGRAM, AND STORAGE MEDIUM

TECHNICAL FIELD

The present invention relates to a document management technique, and more particularly, to a document management apparatus and document management method for implementing security management on electronic data that is handled on a server, an output device, an input device and so on that are interconnected via a network.

BACKGROUND ART

In recent years, electronic data including confidential information (hereinafter referred to as "secure data" and a confidentiality preserving application that generates or edits secure data will be called a "secured application") has come to be handled among various devices such as personal computers, servers, output devices and input devices over a network. Consequently, there are increasing chances of secure data leaking to the outside world, e.g., printing out of secure data from an output device, saving of secure data to a personally managed personal computer or to a USB storage, or taking out of such saved data.

Since it is extremely difficult to identify a path of leaking once secure data is taken out, grater importance is placed on document management techniques (security management techniques) as means for preventing information leakage and various efforts have been made.

Such efforts include various system management techniques so far proposed, such as one that encrypts secure data itself and permits only those who have access right to the encrypted secure data, one that encrypts data transmitted on a network and has a sender and a receiver share a decryption key, and one that manages access to a printing apparatus itself with a user ID or password and enables printing only when the user is authenticated.

However, as such system management techniques are local processing (i.e., security management for implementing partial processing in a system), there are also efforts for applying exhaustive security management by combining various systems (security management techniques) to supplement the locality. In such a system, however, increased burden is placed on one who sets access right, and also it is difficult for an access right owner to completely prevent information leakage due to occurrence of security holes that can result from incidental omission in access right setting.

To address such problems, a mechanism (security management technique) called secure document system has gained attention in which a security management server centrally manages secure data handled on personal computers (PCs) and input/output devices that are connected to a network.

A feature of the secure document system is that it has a database for storing encrypted secure data and a security management server for performing access right management, and that a PC or an input/output device connected to a network has to be authenticated by the security management server before being able to access the encrypted secure data.

In a secure document system, PCs and input/output devices need to be connected to a security server because authentication by the security management server is essential to access encrypted secure data. Even if secure data is taken outside the network, no access can be made to the secure data because authentication by the security management server cannot be obtained. In addition, in the secure document system, a security management server can collectively manage all access conditions and access history of PCs, applications, or input/output devices that access the secure data.

However, the secure document system has a problem in that, when new data other than secure data (data partially including secure data) is generated by obtaining image data and the like with print screen function (i.e., function of hard-copying a display screen) of a PC that accessed secure data and inserting or attaching the image data to data other than secure data, access restriction does not work for the resulting data and the data is not covered by management of the secure document system.

As a technique for managing security of data that includes copy of secure data, there has been proposed a technique that adds a copy-forgery-inhibited pattern to data that partially includes secure data, such as one disclosed by Japanese Patent Laid-Open No. 2002-84413, where tampering can be detected from modification of the copy-forgery-inhibited pattern. With the technique of Japanese Patent Laid-Open No. 2002-84413, however, utilization of print screen function is practically restricted, and data that is generated by inserting/attaching an image obtained with print screen function that should be intrinsically protected to data other than secure data is excluded from security management. Security management by the technique of Japanese Patent Laid-Open No. 2002-84413 has a problem in that utilization of print screen function is restricted and thus convenience for users is significantly limited.

DISCLOSURE OF INVENTION

The present invention has been made in view of the problems, and is intended to attain at least one of following objects.

An object of the invention is to safely manage data that should be protected and to secure such data from leakage or unauthorized use.

Another object of the invention is to provide a document management technique that enables security management on data that is obtained with print screen function while maintaining utility of print screen function.

To attain the objects, the document management apparatus and document management method of the invention generally comprise following arrangements.

A document management apparatus that communicates with a server and manages confidentiality of electronic data generated by a confidentiality preservation program, comprising:

a screen image deletion unit adapted to delete a screen image displayed on a display unit that is based on the electronic data when the confidentiality preservation program transitions to termination processing or suspension processing; and an object deletion unit adapted to delete an object that is registered as copy of a screen image displayed on the display unit.

A document management method for a document management apparatus that communicates with a server and manages confidentiality of electronic data generated by a confidentiality preservation program, comprising:

a screen image deleting step of deleting a screen image displayed on a display unit that is based on the electronic data when the confidentiality preservation program transitions to termination processing or suspension processing; and an object deleting step of deleting an object that is registered as copy of a screen image displayed on the display unit.

According to the invention, in a secure document system, management for confidentiality preservation on data obtained with print screen function is enabled, while print screen function can be still utilized without usage restriction for confidentiality preservation, thereby maintaining users' convenience.

Further features of the present invention will become apparent from the following description of exemplary embodiments (with reference to the attached drawings).

BRIEF DESCRIPTION OF DRAWINGS

The accompanying drawings, which are incorporated in and constitute a part of the specification, illustrate embodiments of the invention and, together with the description, serve to explain the principles of the invention.

FIG. 1C shows an example of screen images expanded in graphic memory;

FIG. 6B shows a task management table managed by a task control module;

FIG. 7 illustrates the flow of terminating a secure application which is a currently active application when an application to be newly activated is a normal application;

FIG. 9C is a flowchart generally illustrating the flow of processing by software modules.

BEST MODE FOR CARRYING OUT THE INVENTION

Preferred embodiments of the present invention will now be described in detail in accordance with the accompanying drawings.

First Embodiment

Embodiments of the invention will be described with respect to accompanying drawings.

<Hardware Configuration>

Figure 1A:
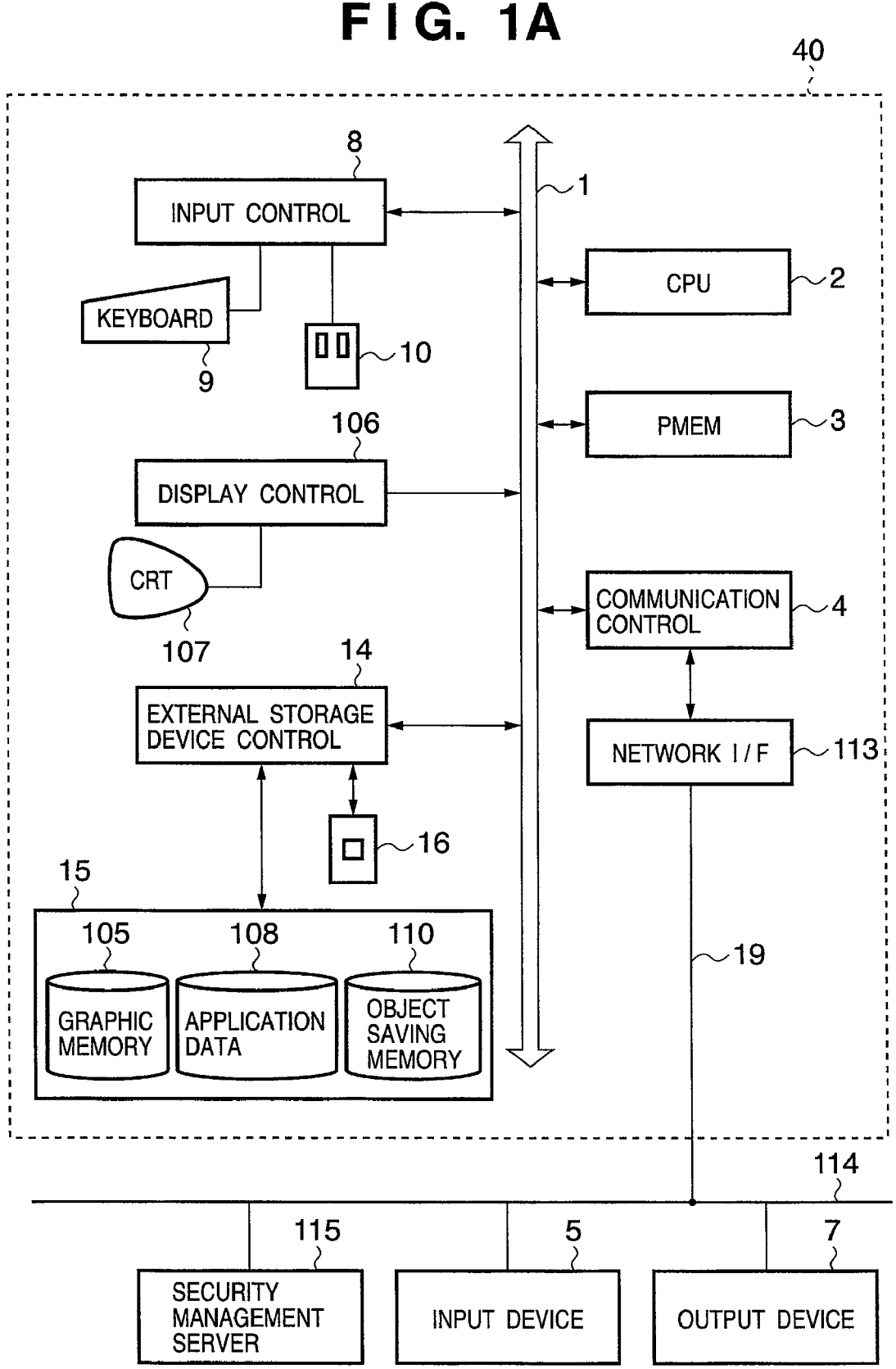
FIG. 1A is a block diagram showing the hardware configuration of a document management apparatus 40 according to an embodiment of the invention.

FIG. 1A is a block diagram showing the hardware configuration of a document management apparatus 40 according to an embodiment of the invention. Reference numeral 1 denotes a system bus, to which components to be discussed below are connected. Reference numeral 2 denotes a CPU, which is capable of controlling overall processing relevant to management of data confidentiality preservation (security management) on the document management apparatus 40. Reference numeral 3 denotes program memory (PMEM) which stores programs for executing various processing relevant to data editing and/or security management under overall control by the CPU 2. Specific modules of programs stored therein include various application modules 101, a pasted object management module 102, and a screen hardcopy control module 103 shown in FIG. 1B. They will be described below with reference to FIG. 1B. The CPU 2 selects from these programs as appropriate and reads in a program for security management and the like to execute it.

Reference numeral 4 denotes a communication control section for controlling input/output data at a network interface (I/F) 113. Signals output from the network interface 113 are sent over a communication line 19 to a communication port of a security management server 115 that is connected to a network 114. Reference numeral 115 denotes a security server that is connected over the network 114. Processing relating to output of data to an output device 7 (e.g., a printer) that is shared on the network 114 and/or saving and reading of secure data to/from the security management server 115 are performed via the communication control section 4 under the overall control of the CPU 2.

Reference numeral 5 denotes an input device for inputting image data and the like, and data input from the input device 5 is also input to the network interface 113. The input device 5 may be a scanner or a digital camera. A confidentiality preservation program (hereinafter referred to as a "secured program") can edit image data input from the input device 5 and edited image data is saved as secure data.

Reference numeral 8 denotes an input control section, to which a keyboard 9 and a pointing device (PD) such as a mouse 10 are connected. An operator can instruct operation of the system by operating the keyboard 9. For example, the operator can perform operation relating to security management for a document that utilizes print screen function. Here, the keyboard 9 and PD 10 can be operated for instructing selection/processing of image information or character/numeric data that is contained in an electronic document file displayed on a CRT 107, or for setting printing parameters for electronic data.

Reference numeral 106 denotes a display control section, which is capable of display control in accordance with position or rendering property information of data to be displayed on the CRT 107.

Reference numerals 15 and 16 denote storage devices for storing electronic data and the like; 15 can be formed by a hard disk (hereinafter abbreviated as a "HD") and 16 by a USB storage, for example. The storage device 15 includes graphic memory 105 for storing images generated by an image display formation module 104 (see FIG. 1B), application data 108 for use when various application program modules 101 (see FIG. 1B) are executed, and object saving memory 110 for saving various images (hereinafter "objects") that are managed by the pasted object management module 102 (see FIG. 1B).

In this embodiment, various programs stored in the program memory (PMEM) 3 may be stored in the storage device 15.

A storage medium for storing electronic data and various application modules may also be a device such as a flexible disk, CD-ROM, DVD, memory card, and magneto-optical disk.

The document management apparatus 40 that is connected to the security management server 115 via the network 114 forms a secure document system. In this system, the security management server 115 can manage saving and registration of encrypted secure data on the document management apparatus 40 and access to registered secure data. The document management apparatus 40 connected to the network 114 needs to be authenticated by the security management server 115 as appropriate in order to access encrypted secure data. Various cryptographic techniques can be applied to encryption in the document management apparatus 40. For example, secret key and public key encryption used in key cryptography and other cryptographies can be applied, but detailed description on them is omitted herein.

The document management apparatus 40 which communicates with the security management server 115 and manages confidentiality of electronic data (secure data) generated by a confidentiality preservation program (a secure application) has a screen image deletion section for deleting screen data based on electronic data displayed on the CRT 107 when the confidentiality preservation program transitions to termination process or suspension process, and an object deletion section for deleting an object which is registered as copy of a screen image displayed on the CRT 107. In this case, a secure application whose execution is controlled under control of the CPU 2 can function as the screen image deletion section and the object deletion section. Suspension processing refers to processing performed in suspended state and/or interrupting a task and waiting for an instruction from an operating system. Suspended state includes a state in which, when a task for a secure application is not selected by window switching program of the operating system, processing already accepted is handled by the task in the background of a main task.

<Software Module Configuration>

Figure 1B:
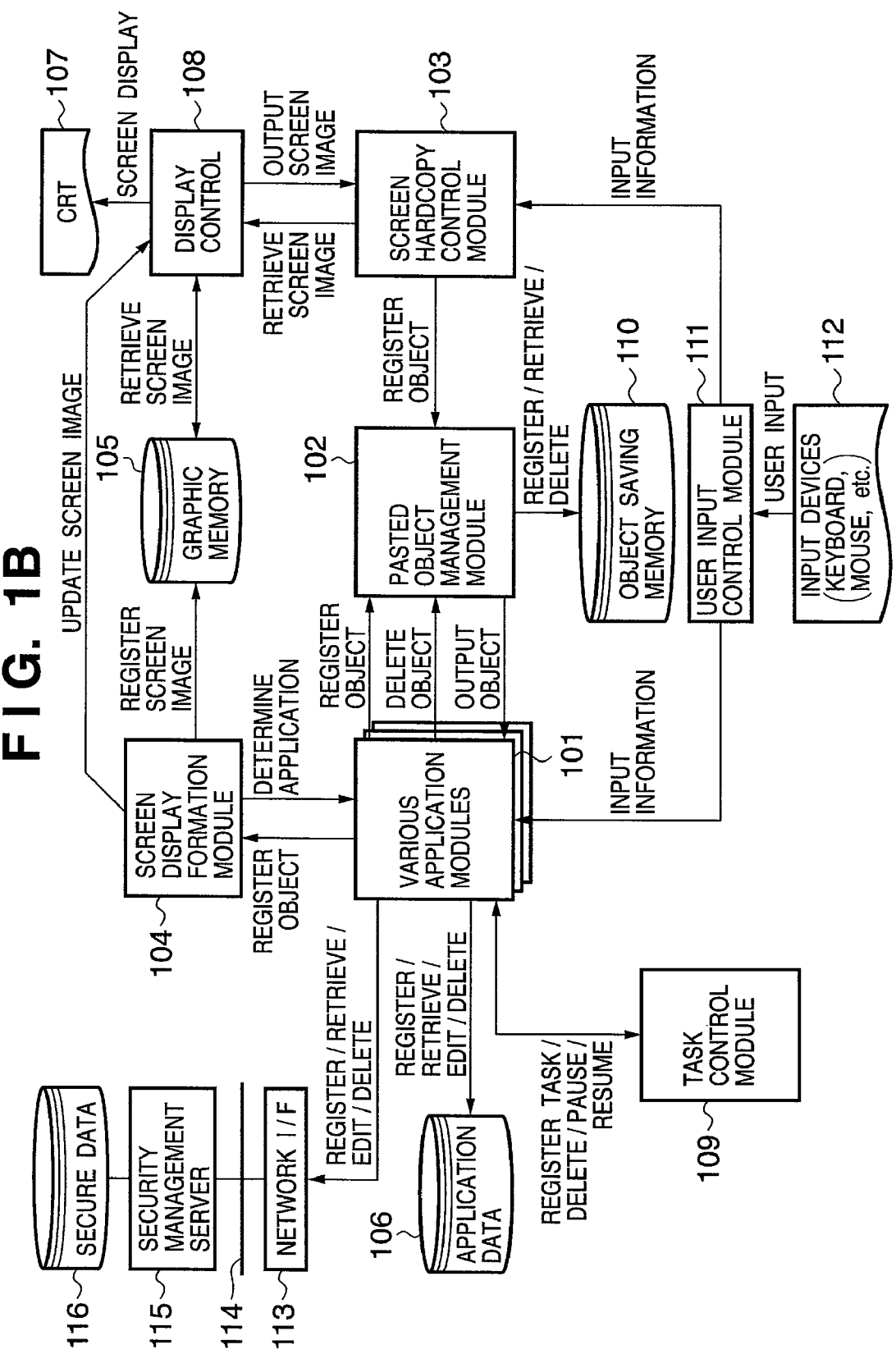
FIG. 1B illustrates the module configuration of software programs that are executed on the document management apparatus.

The module configuration of software according to the embodiment of the invention will be now described. FIG. 1B illustrates the module configuration of software that is executed under control of the CPU 2 on the document management apparatus 40 (i.e., a host computer) appropriate for the embodiment.

Various application modules 101 are program modules capable of editing a document, business form, and/or image, and a secure application for performing processing for preserving confidentiality of electronic data can function as a program module included in the application modules 101. As general operations, the application modules 101 can retrieve application data 108 from the storage device 15 of the document management apparatus 40 and save result of a user's editing or deletion in the storage device 15.

A secure application included in the application modules 101 is also capable of communicating via the network I/F 113 with the security management server 115 that is connected to the network 114, retrieving secure data 116 relevant to security management from the database of the security management server 115 after authentication by the security management server 115, decoding the secure data 116, and saving result of the user's editing and deletion on the document management apparatus 40 in the database of the security management server 115 again encrypting the same. Secure applications included in the application modules 101 enable management of security of electronic data as secure data that is processed on the document management apparatus 40.

When electronic data is edited, the application data 108 and secure data 116 are copied to memory (not shown) that is managed by the application modules 101 and data copied into the memory is edited (including data deletion) by the application modules 101. The application modules 101 rewrite the application data 108 and secure data 116 to edited data in the memory after all editing is complete.

For example, in termination process, a secure application included in the application modules 101 can generate a registration instruction to register data edited in the memory as secure data to the database of the security management server 115, and the edited secure data is encrypted and transmitted to the security management server 115 via the network I/F 113 described above.

Upon receiving the instruction, the security management server 115 performs authentication for the document management apparatus 40 and, after the authentication, stores the transmitted encrypted data in the database as secure data.

The task control module 109 is a program module that is responsible for management of application modules that are currently running and operable by the user and ones suspended.

Figure 6A:
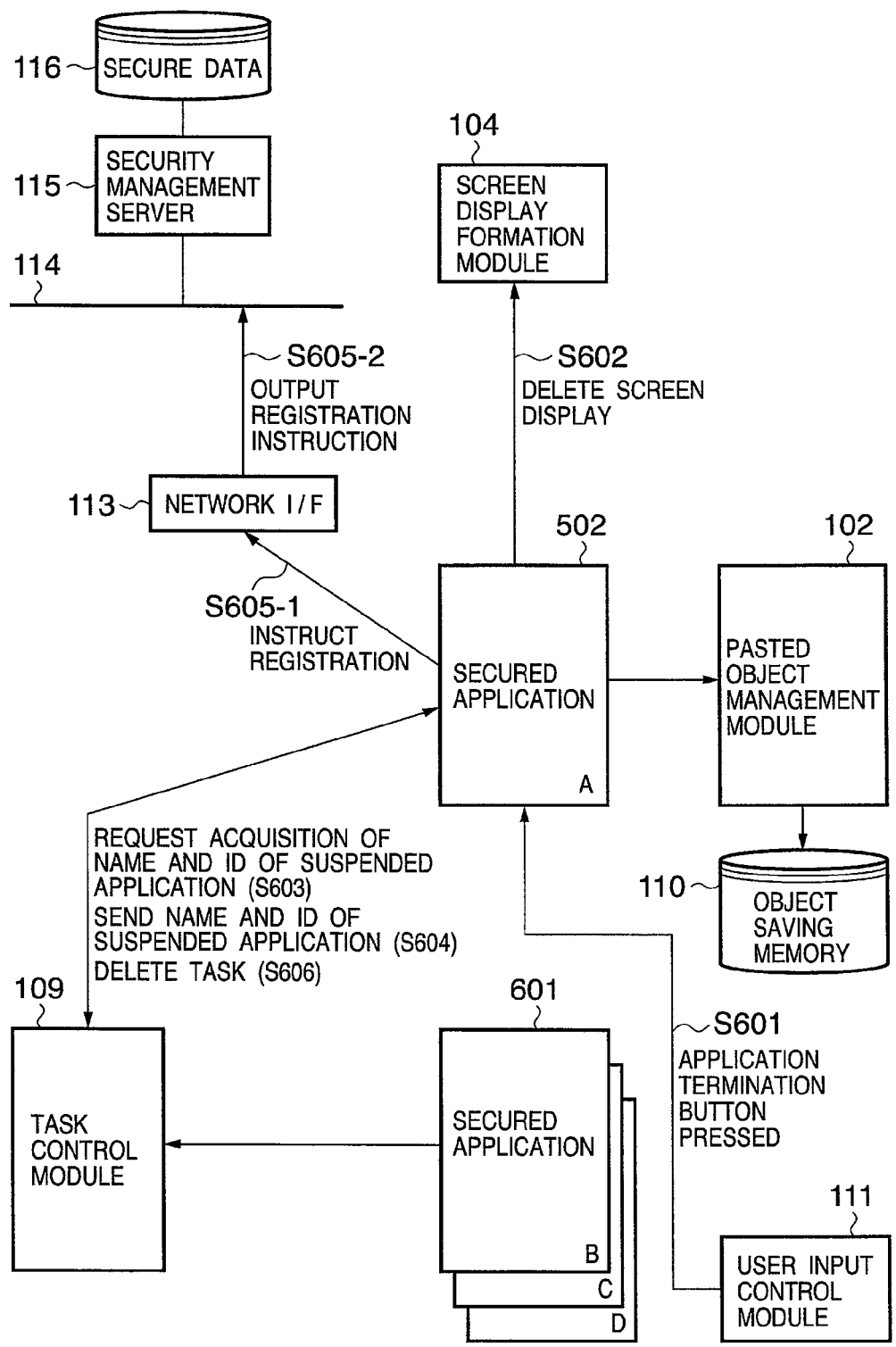
FIG. 6A illustrates the flow of processing for a case where there is another secure application as a suspended application when a secure application is terminated.

Each application registers its application name and ID for indicating that the application has been activated to the task control module 109 upon activated (see FIG. 6B). For example, the image display formation module 104 or screen hardcopy control module 103 as another application can reference either of application name or ID to determine whether an application is a secure application or a normal application (i.e., an application that is not involved in security management).

When a plurality of application modules are activated, management by the task control module 109 makes only one of the application modules executable and other application modules are managed in suspended state. When a running application is terminated, the application outputs an instruction for deleting its task to the task control module 109. When an application now running is temporally stopped or an application now being temporarily stopped is to run again, the application indicates it to the task control module 109 so that the task control module 109 manages the activation status of applications.

When a plurality of application modules are activated on the document management apparatus 40, the user can specify an application to run with indication on the screen of the CRT 107 with the keyboard 9 or mouse 10. Also, when a new application module is activated in response to the user's operation, the task control module 109 can switch the application module into running state and place other activated application modules into suspended state.

The application modules 101 can have the CRT 107 display the application data 108 or secure data 116 thereon by way of the screen display formation module 104 and the display control section 106. The user can edit data using the input device 112, e.g. the keyboard 9 and the mouse 10, while looking at the CRT 107. The result of the user's operation of the input device 112 is fed back as input information to the application modules 101 via the user input control module 111. The application modules 101 modify data based on input information fed back by the user input control module 111 and input the result of modification to the screen display formation module 104.

The application modules 101 are further capable of outputting an instruction to register various images (hereinafter referred to as "objects") to the pasted object management module 102 or delete the objects. The pasted object management module 102 temporarily saves a registered object to the object saving memory 110 under control of an external storage device control section 14. The pasted object management module 102 can retrieve objects from the object saving memory 110 and delete the objects, in addition to registration of objects. The application modules 101 can also output an instruction relating to registration, retrieval, or deletion of objects to the pasted object management module 102 at any time.

The pasted object management module 102 can also register an object that is input from the screen hardcopy control module 103. When the user instructs execution of print screen function (i.e. function of hard-copying the screen) via the input device 112, the user input control module 111 inputs the user's instruction as input information to the screen hardcopy control module 103. The screen hardcopy control module 103 obtains image data now displayed on the CRT 107 via the display control section 106 and instructs the pasted object management module 102 to register the obtained image data as an object. Upon the instruction, the pasted object management module 102 saves the object in the object saving memory 110.

The applications 101 can also retrieve an object such as image data obtained by the screen hardcopy control module 103 from the object saving memory 110 in which the object is registered via the pasted object management module 102.

The screen display formation module 104 expands image data to be displayed on the CRT 107 (a screen image) and registers the image to the graphic memory 105 based on a request received from the application modules 101. At this point, the screen display formation module 104 can determine whether a requesting application is a secure application or a normal application based on its application name or ID. If it is a secure application, the module 104 can expand the screen image and register the same to the graphic memory 105 in a manner that can distinguish the request from the application from one from a normal application.

FIG. 1C shows an example of screen images (1051 to 1053) that are expanded in the graphic memory 105. Identification information (e.g. identifier "S") 1054 is added to a screen image that is expanded based on a request from a secure application, which enables it to be distinguished from other screen images (1052 and 1053).

When retrieval of a CRT image is instructed from the screen hardcopy control module 103, the display control section 106 can retrieve the screen image (CRT image) expanded in the graphic memory 105 and output the retrieved screen image (CRT image) to the screen hardcopy control module 103.

When retrieving a screen image expanded in the graphic memory 105, the display control section 106 can determine that the screen image is an image by a secure application if identification information 1054 is added to the specified screen image.

Print screen function will be described with reference to FIGS. 2A, 2B, 3A and 3B.

FIGS. 2A, 2B, 3A and 3B illustrate a procedure of operation relating to pasting of an object using print screen function.

Figure 2A:
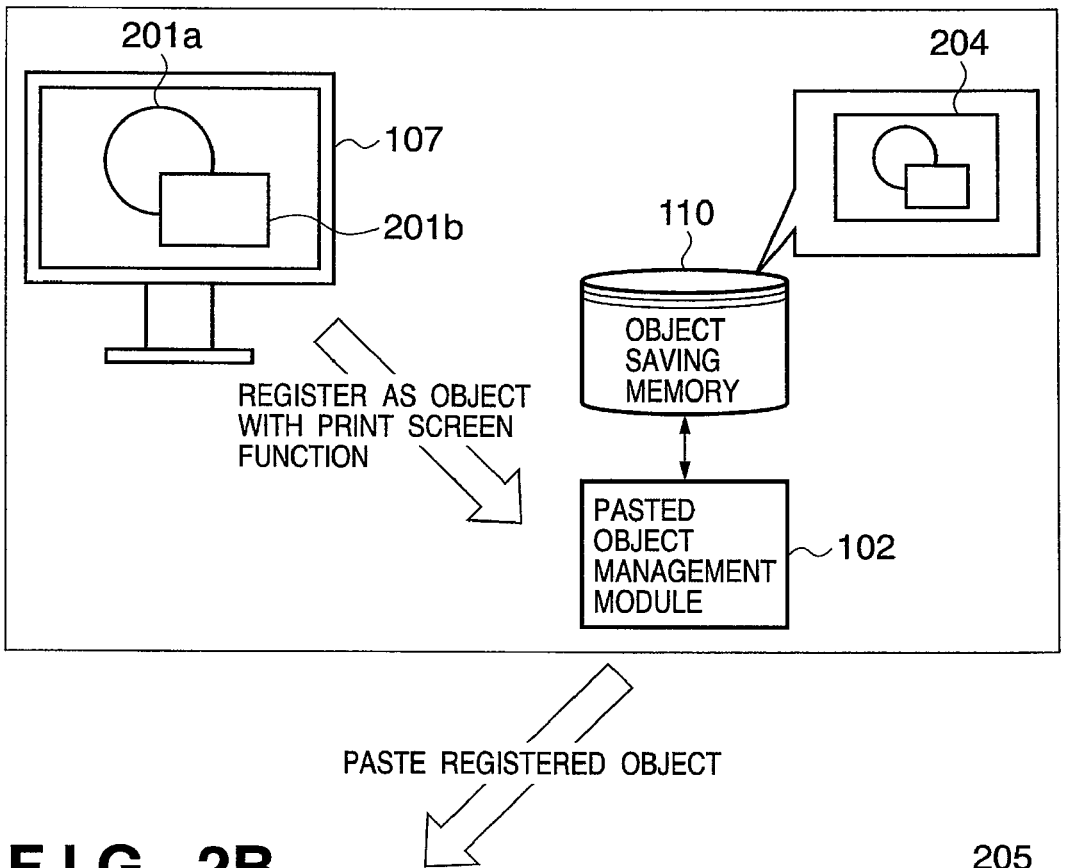
FIGS. 2A and 2B illustrate the procedure of operation relating to pasting of objects using print screen function.

In FIG. 2A, by pressing a print screen key 304, which is positioned at 302 as a portion of the keyboard 9 (see FIG. 3A), images displayed on the CRT 107 (201a and 201b) are saved as objects in the object saving memory 110 that is managed by the pasted object management module 102 (204).

Figure 2B:
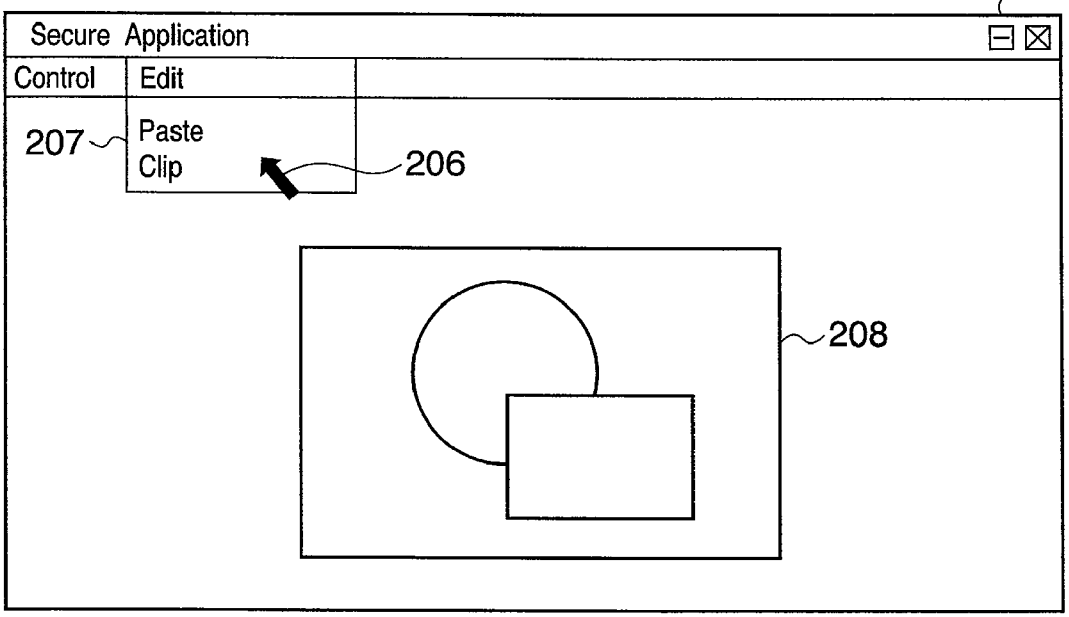

FIG. 2B shows an example of displayed screen 205 for a secure application. When the user selects operation of "Paste" 207 from a pull-down menu 206 for editing on the display screen 205, the secure application obtains an object 204 that is saved in the object saving memory 110 via the pasted object management module 102, and rewrites application data to paste an image (an object) obtained with print screen function on the display screen 205 as shown at 208 of FIG. 2B.

Figure 3A:
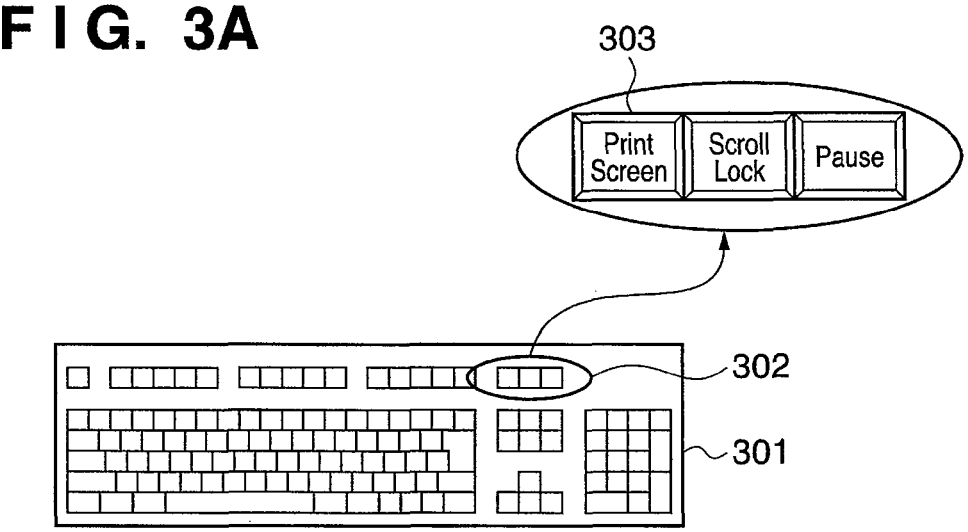
FIGS. 3A and 3B illustrate the procedure of operation relating to pasting of objects using print screen function.
Figure 3B:
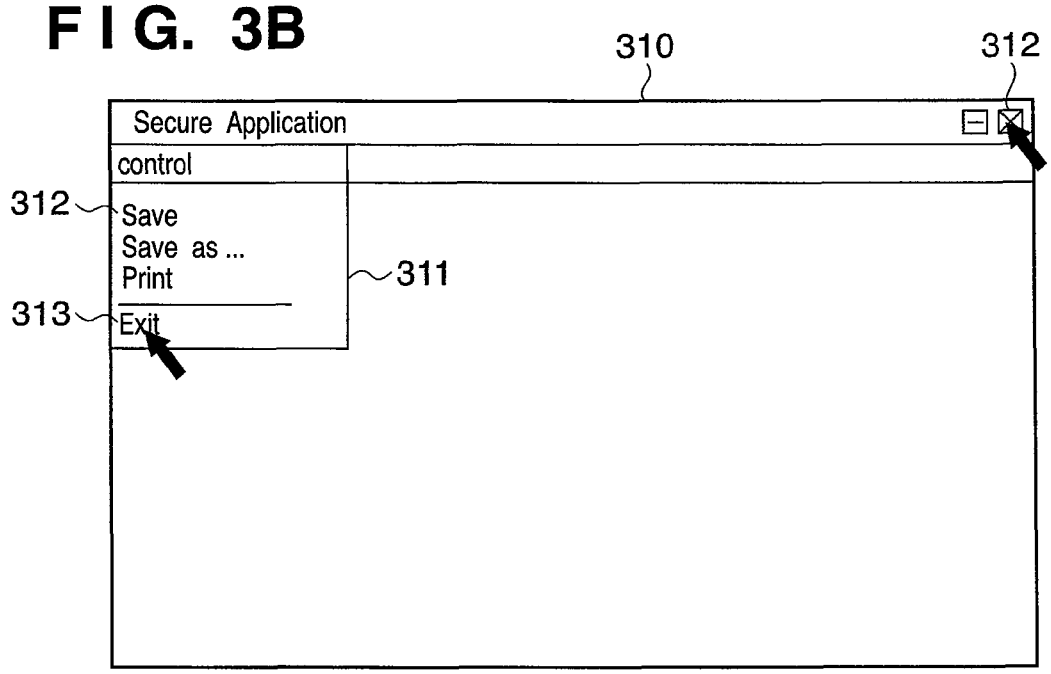

Similarly, operation relating to saving or exit of a display screen for a secure application is executed by the user selecting either "Save" 312 or "Exit" 313 in a pull-down menu 311 shown in FIG. 3B with the mouse 10 or keyboard 9. In FIG. 3B, reference numeral 312 denotes a short-cut button for executing "Exit" processing and it is also possible to execute operation equivalent to the "Exit" from the pull-down menu 311 by pressing this button.

Data that is newly generated by a secure application pasting data that is hard-copied with print screen function is subject to security management as security data in the document management apparatus 40 and the security management server 115.

(Processing Relating to Screen Display, Saving and Pasting of a Screen Image)

Figures 1, 9A:
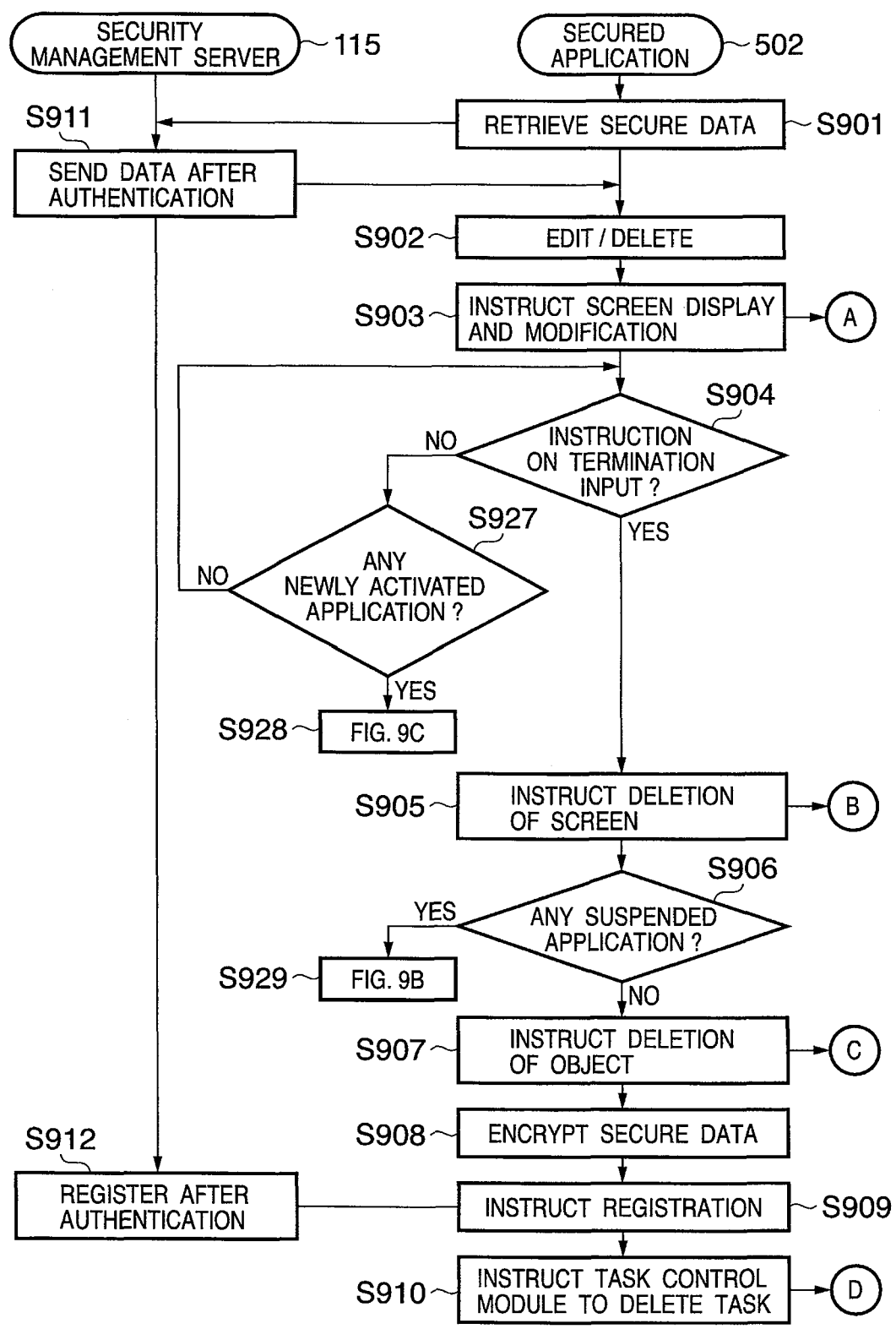
FIGS. 9A-1 to 9A-3 are flowcharts generally illustrating the flow of processing by software modules.
Figures 2, 9A:
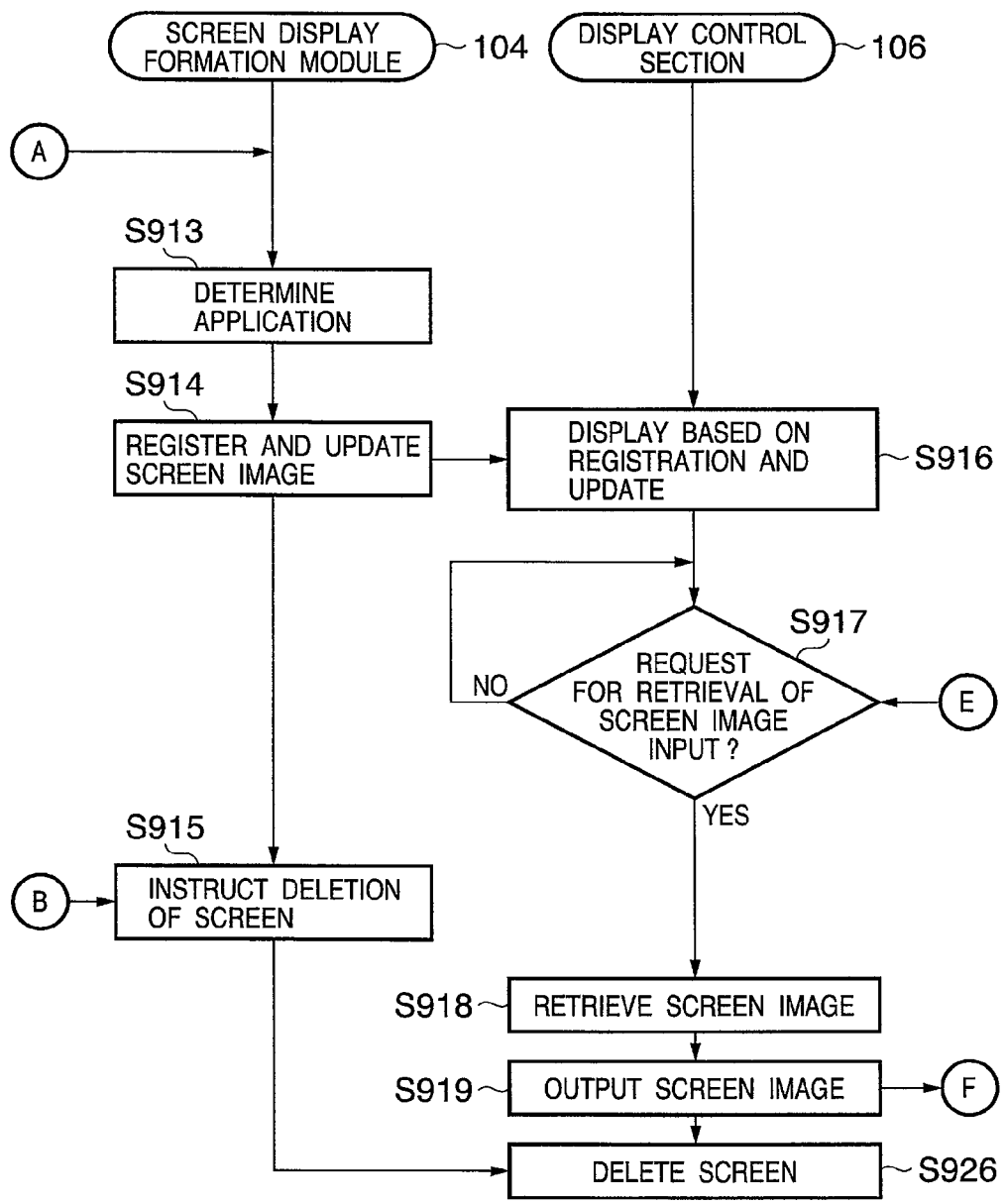
Figures 3, 9A:
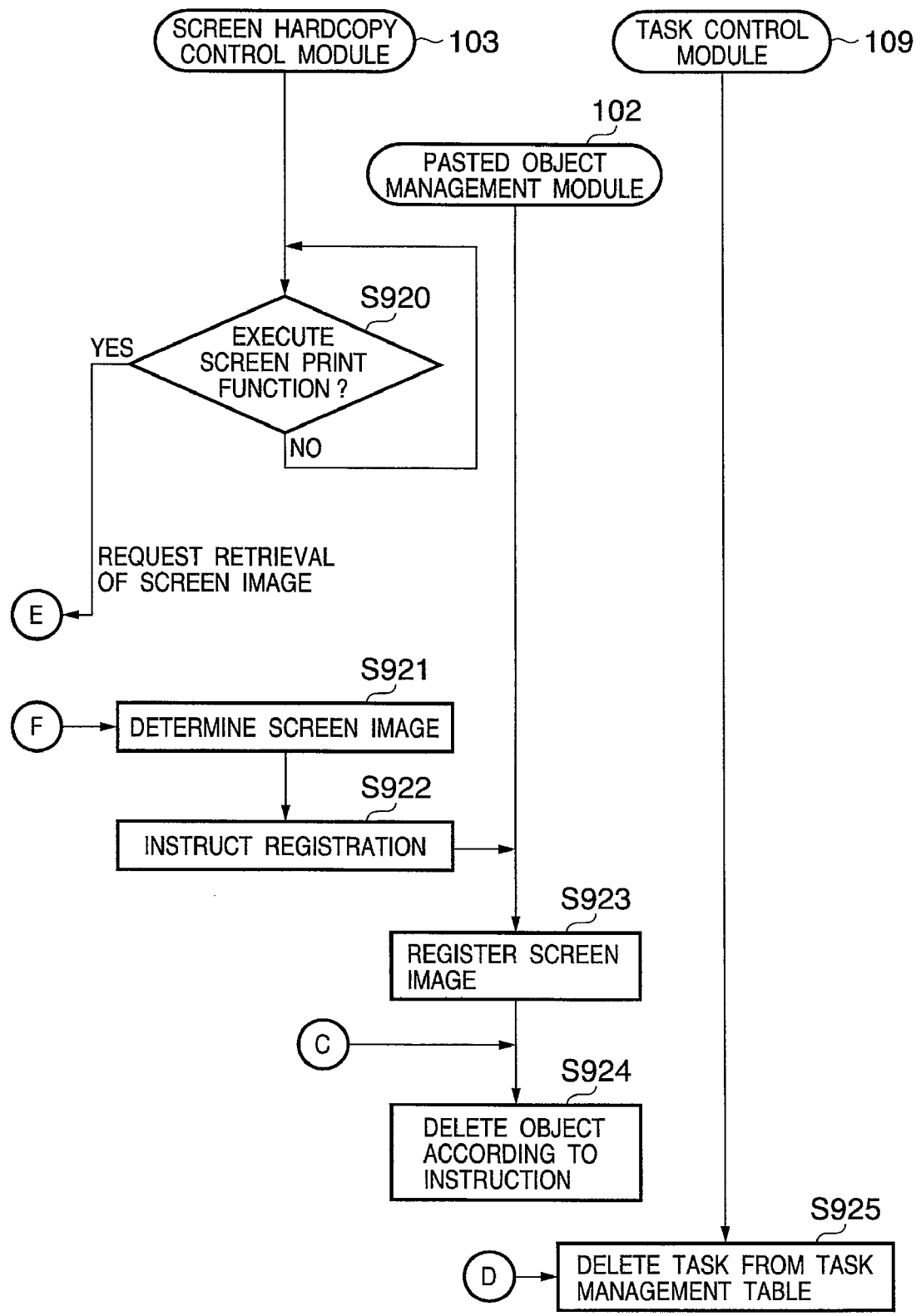

FIGS. 9A-1 to 9A-3 are flowcharts generally illustrating the flow of processing by software modules. When a secure application requests retrieval of secure data saved in the security management server 115 (S901), the security management server 115 sends the specified secure data after authentication (S911).

Figure 4A:
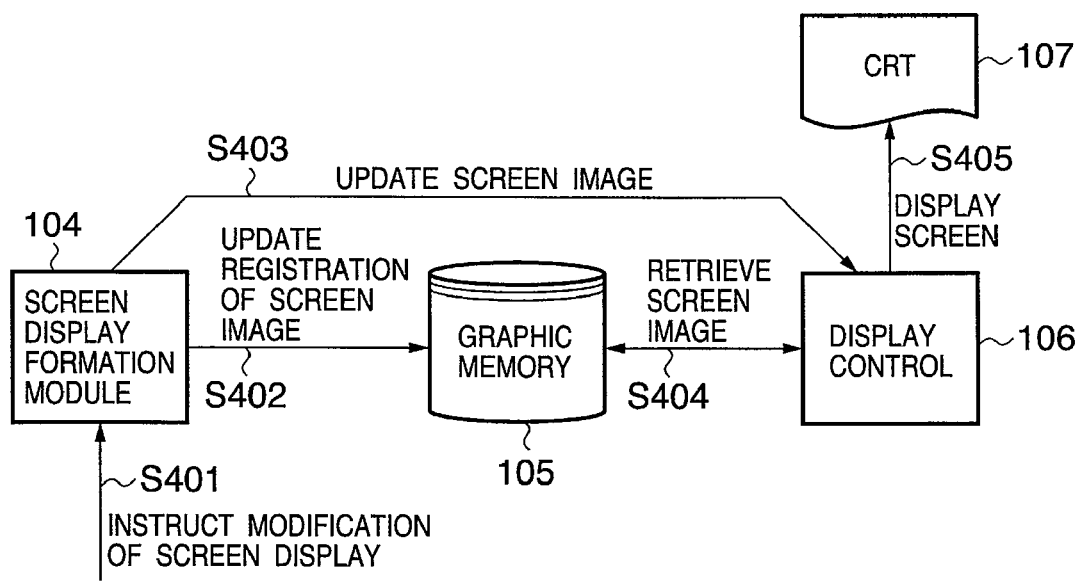
FIG. 4A illustrates the flow of process relating to screen display on CRT 107 and FIG. 4B illustrates the flow of process relating to saving and pasting of a screen image for a case print screen function is executed.

The secure application can edit or delete the secure data after decoding the encrypted secure data (S902). Subsequently, the secure application outputs an instruction on screen display to the screen display formation module 104 (S903). Here, a detailed flow of process associated with screen display on the CRT 107 will be described with reference to the block diagram of FIG. 4A in accordance with FIGS. 9A-1 to 9A-3. Specific details of this process is based on execution of program modules under the overall control by the CPU 2.

When an instruction on screen display or modification of screen display (S401) is input from the application modules 101 including secure application(s) to the image display formation module 104, the screen display formation module 104 determines whether the application that output the instruction on screen display or modification of screen display is a secure application (S913 in FIGS. 9A-2). And registration or update of a screen image appropriate for the instruction on screen display or modification of screen display (S401) is made in the graphic memory 105 (S402, and S914 of FIGS. 9A-2). Here, if the instruction is from a secure application, the image display formation module 104 adds identification information to the screen image to be expanded and registers it in the graphic memory 105 (see FIG. 1C).

If an instruction on modification is received subsequently, the image display formation module 104 notifies the display control section 106 that the contents of the graphic memory 105 has been changed (S403).

Upon receiving the notification that the contents of the graphic memory 105 has been changed from the screen display formation module 104, the display control section 106 retrieves a screen image from the graphic memory 105 (S404) and displays the same on the CRT 107 (S405, and S916 of FIGS. 9A-2).

With the above described process, processing relating to screen display on the CRT 107 and modification of screen display terminates.

(Execution of Print Screen Function)

Figure 4B:
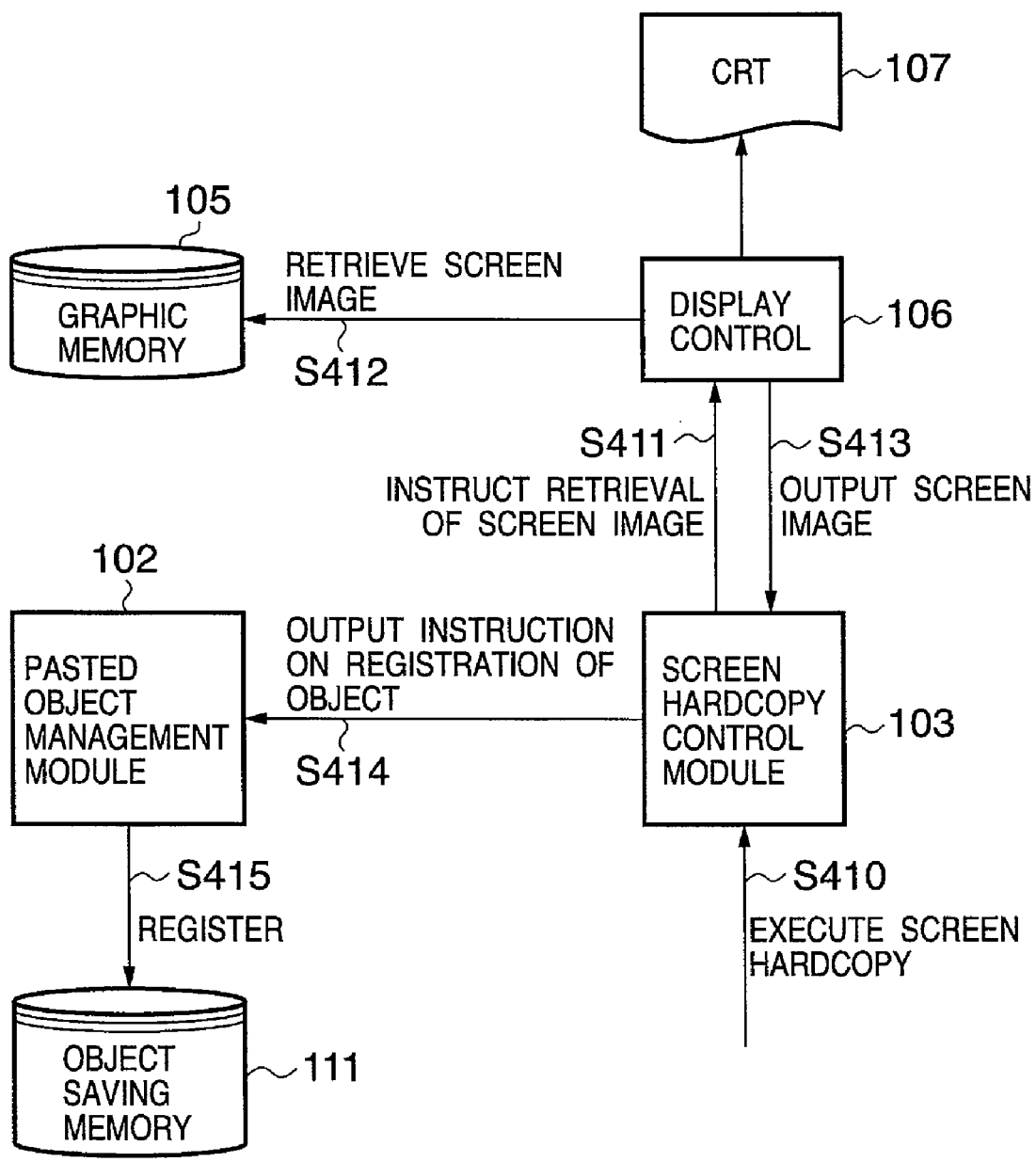

Next, referring to the block diagram of FIG. 4B, a process relating to saving of a screen image when print screen function is executed will be described in accordance with FIGS. 9A-1 to 9A-3.

Initially, when execution of print screen function (execution of screen hard-copying) is instructed through the user's operation of the keyboard 9 (pressing of the button 303 in FIG. 3A) (S410, and YES at S902 of FIGS. 9A-3), the screen hardcopy control module 103 instructs the display control section 106 to retrieve a screen image (S411). In response to the instruction, the display control section 106 retrieves a screen image corresponding to the instruction from the graphic memory 105 (S412, and S918 of FIGS. 9A-2), and thereafter, the display control section 106 outputs the retrieved screen image to the screen hardcopy control module 103 (S413, and S919 of FIGS. 9A-2).

After receiving the screen image output by the display control section 106, the screen hardcopy control module 103 determines whether the screen image accompanies identification information that indicating the image is a screen image for a secure application (S921 in FIGS. 9A-3).

Then, in order to register the obtained screen image as a pasted object, an instruction to register the screen image to the pasted object management module 102 is output (S414, and S922 in FIGS. 9A-3). Here, if the screen image has identification information added thereto, the screen hardcopy control module 103 outputs the screen image to the pasted object management module 102 along with an instruction to register it as an object with identification information in the object saving memory 110.

Figure 1D:
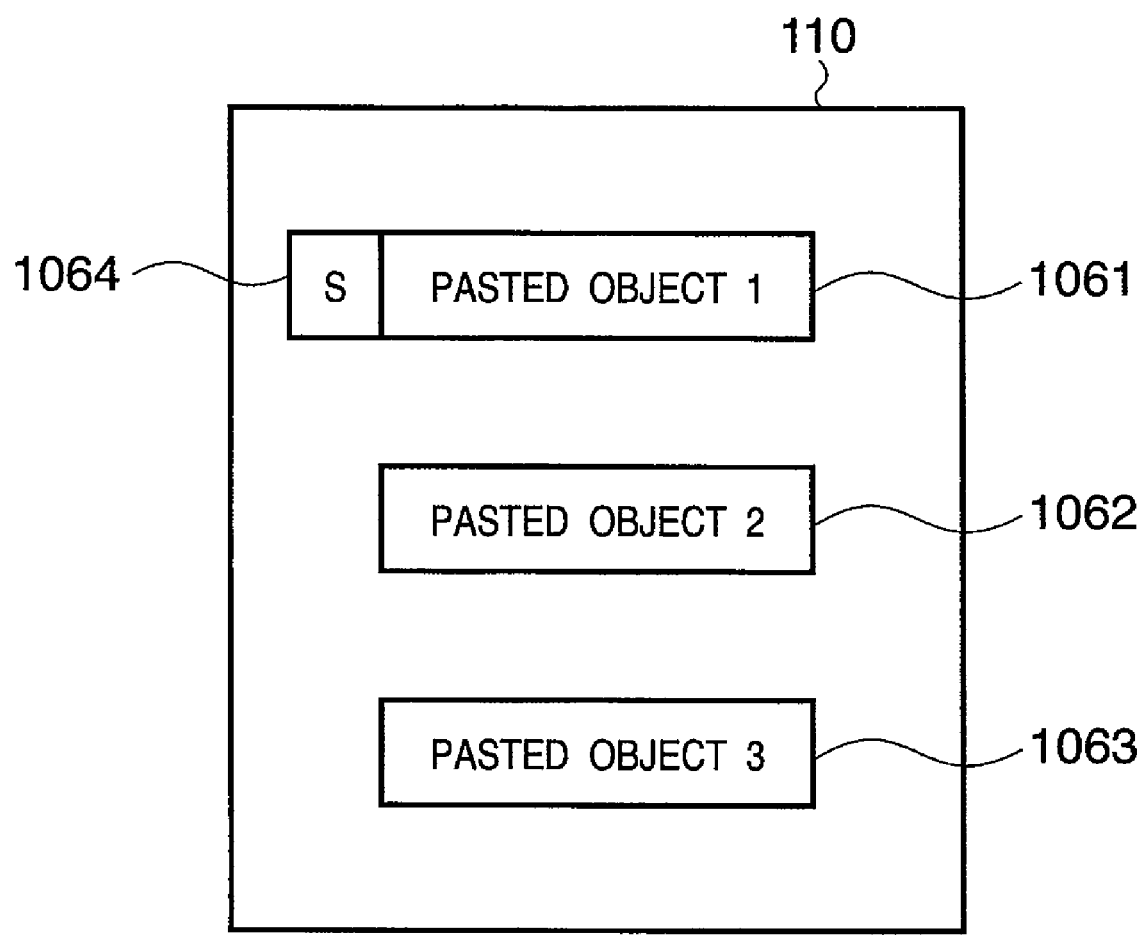
FIG. 1D shows an example of pasted objects registered in object saving memory.

FIG. 1D shows an example of pasted objects (1061 to 1063) that are registered in the object saving memory 110. Identification information (e.g. identifier "S") 1064 is added to a pasted object that is registered based on a screen image from a secure application so that the object can be distinguished from other pasted objects (1062 and 1063).

The pasted object management module 102 saves a screen image that has been output to the object saving memory or a HD and registers it as an object based on output from the display control section 106 (see FIG. 1D. S415, and S923 of FIGS. 9A-3).

With the above described process, the process of retrieving a screen image when print screen function is executed and saving it as a pasted object in the object management module 102 is complete.

(Termination Process of a Secure Application)

Figure 5:
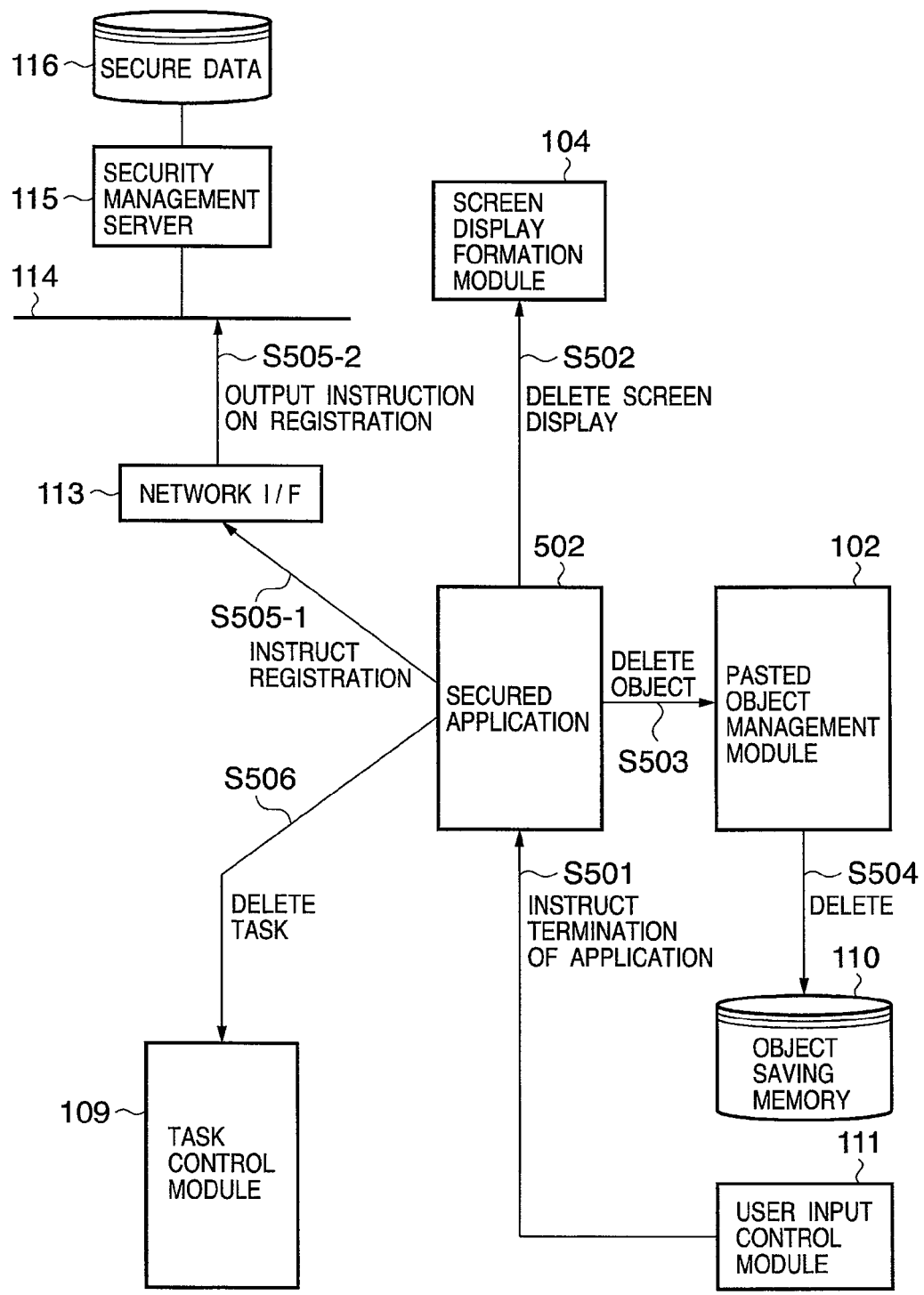
FIG. 5 illustrates the flow of termination of a security application included in various application modules 101.

The following will describe the flow of termination process for the secure application 502 included in the application modules 101 with reference to the block diagram of FIG. 5 and the flowcharts of FIGS. 9A-1 to 9A-3. Specific details of this process is based on execution of program modules under the overall control of the CPU 2.

Initially, when the user instructs termination of the secure application 502 through the input device 112 such as the keyboard 9 and mouse 10 in the manner described with FIG. 3B, the instruction is input to the user input control module 111. In response, the user input control module 111 outputs an application termination instruction to the secure application 502 (S501).

Upon receiving the instruction (S904 in FIG. 9A-1), the secure application 502 instructs the screen display formation module 104 to delete all screen display by the secure application from the CRT 107 (S502, and S905 in FIGS. 9A-1).

Upon receiving the instruction, the screen display formation module 104 informs the display control section 106 that all screen images expanded in the graphic memory 105 or screen images accompanying identification information are to be deleted (S915 in FIGS. 9A-2). The display control section 106 deletes all screen display on the CRT 107 based on deleted screen images (S926 in FIGS. 9A-2).

If there is no other suspended applications when the secure application 502 is terminated (No at S906 in FIGS. 9A-1), the secure application 502 instructs the pasted object management module 102 to delete objects saved in the object saving memory 110 or a HD after instructing deletion of screen display (S503, and S907 in FIGS. 9A-1).

The pasted object management module 102, upon receiving the instruction on object deletion, deletes all objects in the object saving memory 110 or the HD (S504, and S924 in FIGS. 9A-3).

Here, to delete screen display first is an important sequence. This is because, if deletion of objects is instructed first, print screen function might be executed before screen display is deleted subsequently and a screen image displayed by a secure application might remain as a pasted object without being deleted. Thus, such data registration should be prevented.

Also, deletion of objects is not limited to deletion of all objects registered in the object saving memory 110 or the HD. It is also possible to delete only objects that are registered as data handled by the secure application 502 (i.e. copy of a screen image), for example. In that case, the secure application 502 outputs an instruction to delete objects only for objects that are registered based on screen images from a secure application. After receiving the instruction, the pasted object management module 102 deletes only objects that have identification information (1061 in FIG. 1D, for example). This can enable deletion of only certain objects that are subject to confidentiality preservation.

After deletion of objects is complete, the secure application 502 further encrypts data that was being processed by the secure application 502 (secure data) (S908 in FIGS. 9A-1), generates an instruction to register the secure data in order to save it in the database of the security management server 115 (S505-1, and S909 in FIGS. 9A-1), and outputs the instruction on registration to the security management server 115 via the network I/F 113 (S505-2). In response to the registration instruction, the security management server 115 registers the secure data to the database 116 after authentication (S912 in FIGS. 9A-1).

After the above described process is complete, the secure application 502 instructs to delete the task for the secure application 502 among currently running application modules managed by the task control module 109 (S506, and S910 of FIGS. 9A-1).

In response to it, the task control module 109 deletes the task for the secure application 502 and terminates the process.

With the above described process, screen display is deleted and registered objects are deleted when the secure application 502 is shut down. Accordingly, screen display that has been referenced by the secure application 502 or objects for a screen image that was hard-copied with screen print function cannot used by applications other than secure applications, which can preserve confidentiality of data handled by the secure application 502 (i.e. enhance security).

(Termination Process for when there is a Suspended Application)

Next, with reference to FIGS. 6A, 6B, 9A-1 to 9A-3, and 9B, the flow of process will be described for a case there is another secure application 601 as a suspended application when the secure application 502 is terminated. Specific details of this process is based on execution of program modules under the overall control of the CPU 2.

When input that instructs termination of the secure application 502 is input to the user input control module 111, the user input control module 111 outputs an application termination instruction to the secure application 502 (S601).

In response to it, the secure application 502 instructs the screen display formation module 104 to delete all screen display for the secure application 502 from the CRT 107 (S602). Here, processing associated with deletion of screen display is similar to the process at step S502 described with FIG. 5.

Subsequently, the secure application 502 requests the task control module 109 to notify whether there is a suspended application, and if there is any, to send its application name or ID (S603, and S930 in FIG. 9B).

Figure 9B:
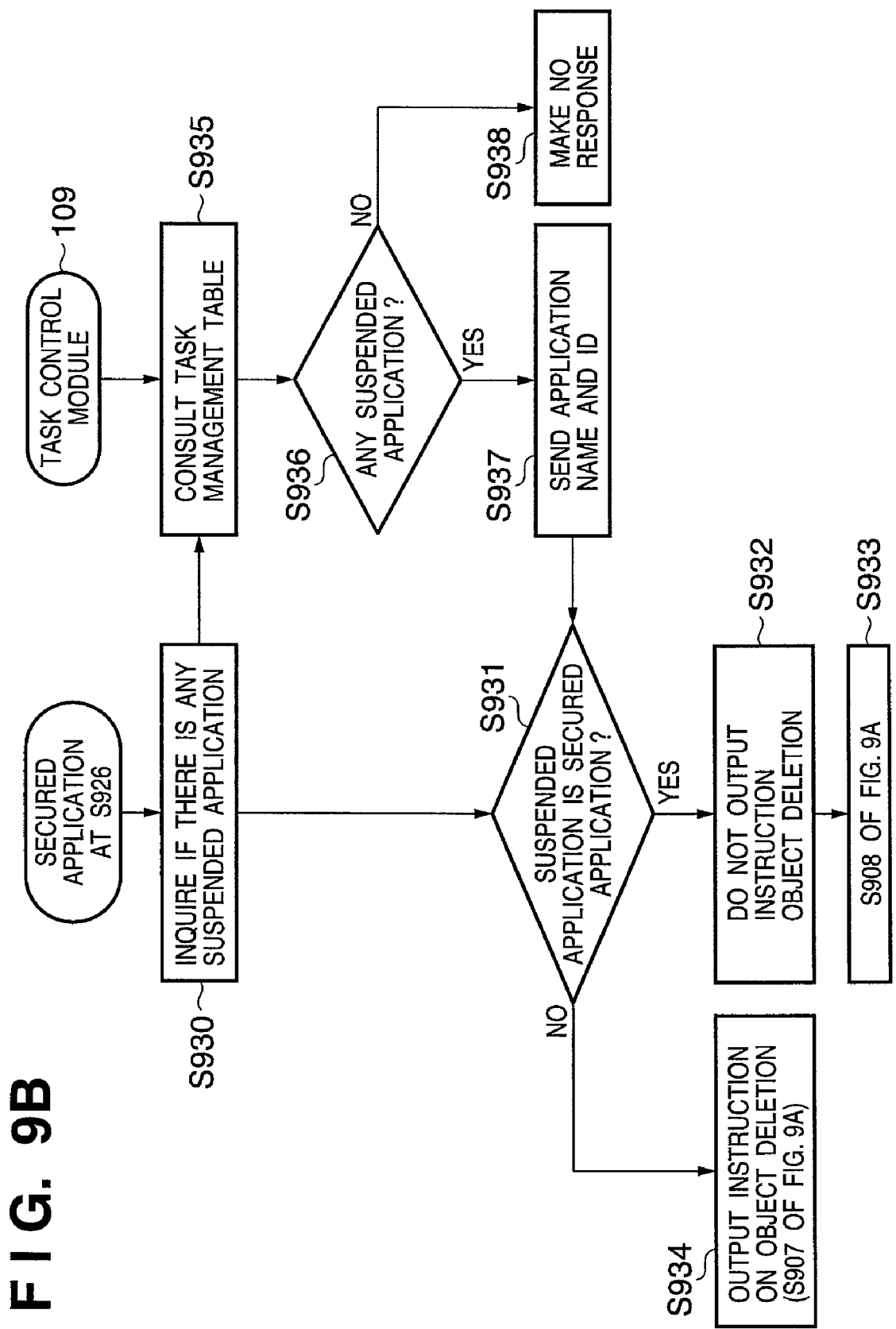
FIG. 9B is a flowchart generally illustrating the flow of processing by software modules.

In response to it, the task control module 109 checks if there is any suspended application (S935 in FIG. 9B), and if there is a suspended application (Yes at S936), it sends the name and ID of the application to the secure application 502 (S604, and S937 in FIG. 9B). If there is no suspended application, however, the task control module 109 does not return a response to the secure application 502. If no response is returned from the task control module 109 after elapse of a certain time period, the secure application 502 can determine that there is no suspended application.

The task control module 109 is capable of managing tasks for respective applications by means of a task management table 609 shown in FIG. 6B, for example. The task control module 109 can reference the task management table 609 to determine whether there is any suspended application from registration of application name, ID, and identification information (in FIG. 6B, "S" is added as identification information that indicates a secure application).

In the case shown in FIG. 6B, application names "B", "C", and "D" are suspended and application name "A" is currently running. Application name "A" represents the secure application 502 in this case. In the task management table 609, identification information ("S") is added to secure applications, and the identification information, an application name and an ID are sent from the task control module 109 to the secure application 502.

Distinction between a secure application and a normal application is not limited to determination based on identification information, but they can be also distinguished from each other based on application name. In that case, the task control module 109 sends an application name and an ID to the secure application 502.

The secure application 502 determines whether a suspended application is a secure application based on the name, ID, and identification information of the suspended application sent from the task control module 109 (S931 in FIG. 9B).

If the suspended applications are all secure applications (in this case, an application to be activated next will be always a secure application), or if at least one secure application is included in the suspended applications and it is possible to specify that secure application (secure application 601 in FIG. 6A, for example) as an application to run next based on an instruction from the secure application 502 now running (Yes at 5931 of FIG. 9B), the secure application 502 now running does not instruct deletion of objects to the pasted object management module 102 (S932 of FIG. 9B).

That is, the secure application 502 does not output an instruction to delete objects saved in the object saving memory 110 or the HD to the pasted object management module 102 (in this case, the secure application 502 does not output an instruction corresponding to step S503 of FIG. 5). Consequently, objects registered in the object saving memory 110 remain registered.

And the procedure proceeds to processing at step S908 of FIGS. 9A-1, where the secure application 502 encrypts secure data in order to save the secure data that was being processed by the secure application (S908 in FIGS. 9A-1), and generates an instruction to register the encrypted secure data (S605-1, 5909 in FIGS. 9A-1). And the secure application 502 outputs the registration instruction to the security management server 115 via the network I/F 113 (S605-2). Here, processing at steps S605-1 and S605-2 corresponds to that at steps S505-1 and S505-2 in FIG. 5.

After outputting the instruction to register the secure data to the security management server 115, the secure application 502 instructs that a task for the secure application 502 be deleted from among currently running application modules managed by the task control module 109 (S606, and S910 in FIGS. 9A-1).

In response to the instruction, task control module 109 deletes registration of the application (A: secure application 502) that is now running from the task management table 609. And the task control module 109 switches task management by shifting a suspended application (B: secure application 601, for example) to running state.

Even after the secure application 601 is switched from suspended to running state, it is still possible to reference objects that are registered in the object saving memory 110 and the like in connection with processing by the secure application 502 that was previously running, to paste the objects, and manage resulting data as new secure data that partially includes objects. Also, the secure application 601 which has newly entered running state can utilize secure data registered by the previous secure application 502 after being authenticated by the security management server 115.

On the other hand, if the suspended applications are not secure applications but normal applications (e.g., application B or C in FIG. 6B) (No at 5931 in FIG. 9B), the secure application 502 outputs an instruction to delete all registered objects or objects having identification information (1061 in FIG. 1D) to the pasted object management module 102 so that data that is registered as objects cannot be referenced from a normal application (S907 in FIGS. 9A-1).

With the above described process, the secure application 502 which transitions from running state to termination and the secure application 601 which transitions from suspended to running state can share objects that are saved in the object saving memory 110 and/or secure data saved on the security management server 115. Thus, it is possible to enhance convenience for users while preserving data confidentiality.

(Termination Process when a Normal Application is Newly Activated)

Next, process flow of terminating the secure application 502, which is an application now running, will be described for a case where an application to be newly activated is not a secure application but a normal application, with reference to the block diagram of FIG. 7 and the flowchart of FIG. 9C. Specific details of this process is based on execution of program modules under the overall control of the CPU 2.

When the user instructs activation of a normal application 702 via the keyboard 9 or mouse 10, the instruction is input to the user input control module 111. In response to the input, the user input control module 111 instructs new application activation to the normal application 702 (S701).

Upon receiving the instruction on new application activation (S939), the normal application 702 outputs an instruction to register its task to the task control module 109 (S702). At this point, the normal application 702 notifies the task control module 109 of its application name and ID.

The task control module 109 makes registration to the task management table 609 based on the notification from the normal application 702 (S940). And in order to have the normal application 702 that is instructed to be newly activated operate in preference to the secure application 502 now operating, the task control module 109 outputs an instruction on temporary halt to the secure application 502 now operating and also notifies it of the application name and ID of the application to be activated next (S703, and S941*a* in FIG. 9C).

The secure application 502 determines whether the application is a normal application or a secure application based on the application name and ID sent from the task control module 109.

If the secure application 502 determines that the application to be activated next is a normal application (No at S942 in FIG. 9C, and when identification information ("S") shown in FIG. 6B is not added that indicates a secure application), the secure application 502 instructs the screen display formation module 104 to modify display on the CRT 107 for the secure application 502 (S704, and S943 in FIG. 9C).

Here, modification of display by the screen display formation module 104 does not delete screen display completely because it is necessary to indicate that a secure application is suspended. Modification of display may be application of shading over screen display to prevent reference from a screen of a normal application and/or minimization of screen display for the secure application 502 as an icon (S946 of FIG. 9C).

After modification of screen display by the screen display formation module 104, the secure application 502 instructs the pasted object management module 102 to delete objects saved in the object saving memory 110 or the HD (S705, and S944 of FIG. 9C).

After receiving the instruction to delete objects from the secure application 502, the pasted object management module 102 deletes all objects in the object saving memory 110 or the HD (S706, and S947 of FIG. 9C).

Consequently, the normal application 702 which is newly activated will be unable to reference any object registered in the object saving memory 110 or the HD (including data that is hardcopy (copy) of a screen image for the secure application 502 with print screen function).

Deletion of objects is not limited to deletion of all objects registered in the object saving memory 110 or the HD as at step S504 of FIG. 5; it is also possible to delete only objects relating to data handled by a secure application, for example. In that case, the secure application 502 outputs an object deletion instruction only for objects that are registered based on a screen image by a secure application. Upon receiving the deletion instruction, the pasted object management module 102 deletes only objects that have identification information (1061 of FIG. 1D, for example). This can enable deletion of only certain objects that are covered by confidentiality preservation.

After outputting the instruction on object deletion, the secure application 502 notifies the task control module 109 that it is ready to transition to suspended state (S707, and S945 of FIG. 9C).

In response to the notification from the secure application 502, the task control module 109 puts the secure application 502 into suspended state and switches the task of the normal application 702 to running state (S941*b* of FIG. 9C).

Subsequently, the user can operate the normal application 702 but cannot view the screen for the secure application 502 which was running previously due to application of shading or iconization (minimization). Also, since all objects that were saved in the object saving memory 110 have been deleted, they cannot be referenced from the screen for the normal application 702 that has been newly activated.

In the example of FIG. 7, processing done when the normal application 702 is newly activated has been described, and the same processing is performed when the state of a normal application is changed from suspended to running in the task management table 609.

With the above described process, objects obtained from screen display that is based on the secure application 502 cannot be used in a normal application, which can prevent leakage of information from the secure application 502.

If display based on the secure application 502 remains displayed on the screen of the CRT 107 in suspended state, the screen display based on the secure application 502 might be hard-copied with print screen function during operation of the normal application 702, which makes security management for a displayed screen difficult. In this embodiment, however, by modifying display based on the secure application 502 before it transitions to suspended state (by means of shading or display minimization as an icon), it is possible to prevent reference, copy or printing of display that is based on the suspended secure application 502 during execution of the normal application 702.

(Termination Process for a Case a Secure Application is Newly Activated)

Figure 8:
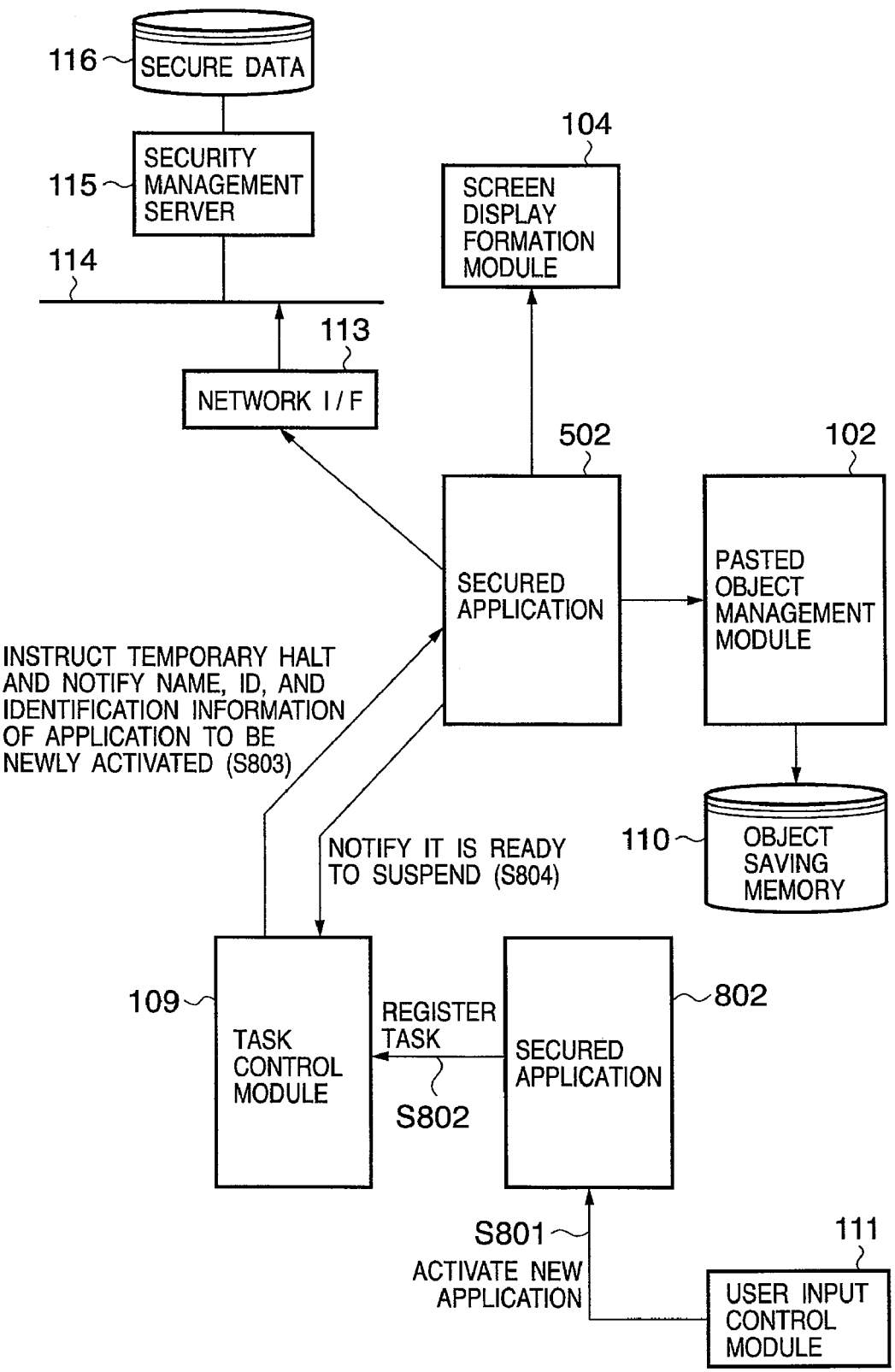
FIG. 8 illustrates the flow of terminating secure application 502 that is a currently active application when an application to be newly activated is secure application 802.
Figure 9D:
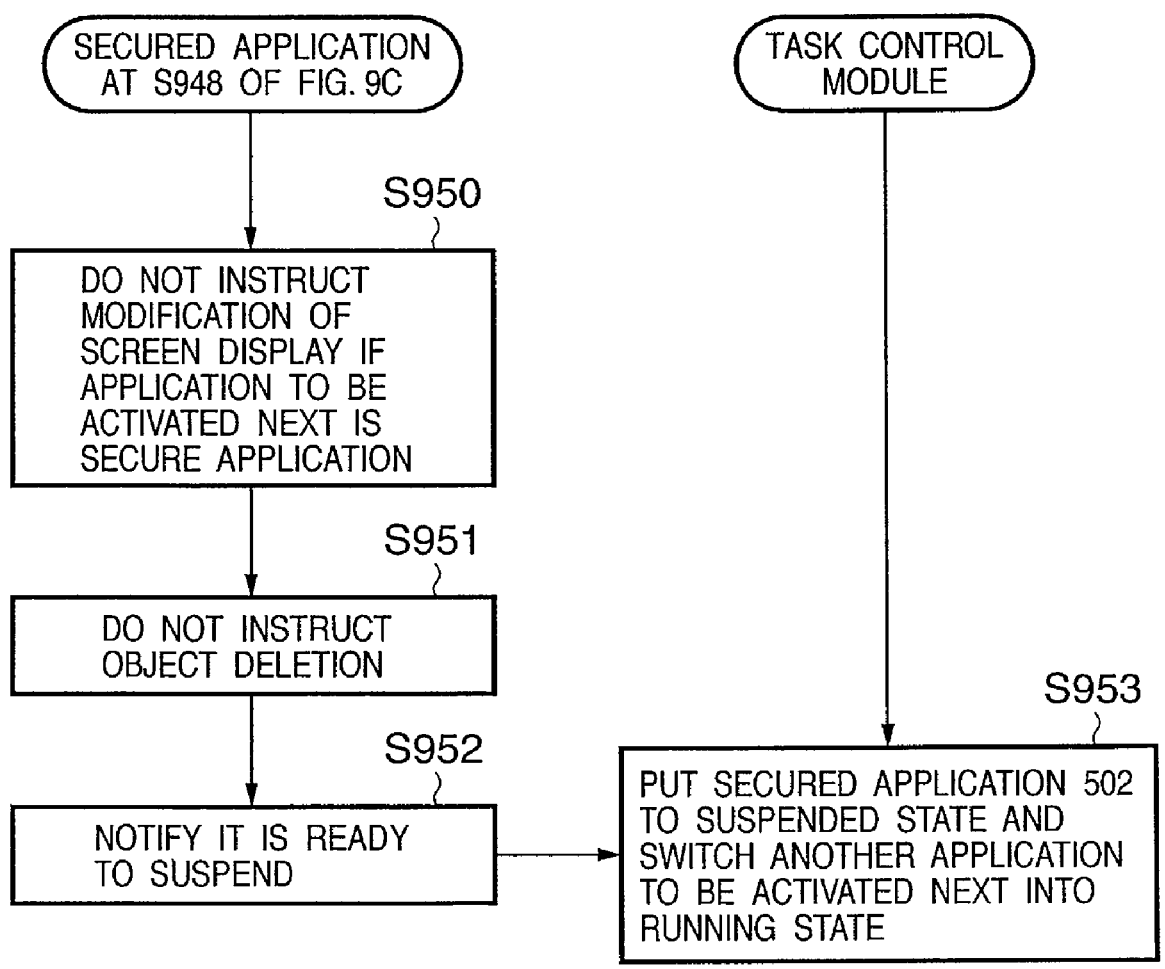
FIG. 9D is a flowchart generally illustrating the flow of processing by software modules.

The following will describe process flow of terminating the secure application 502 that is an application now running when an application to be newly activated is a secure application (Yes at S942 of FIG. 9C), with reference to the block diagram of FIG. 8 and the flowchart of FIG. 9D. Specific details of this process is based on execution of program modules under the overall control by the CPU 2.

When the user instructs activation of a secure application 802 via the keyboard 9 or mouse 10, the instruction is input to the user input control module 111. In response to the input, the user input control module 111 instructs new application activation to the secure application 802 (S801).

Upon receiving the instruction, the secure application 802 outputs an instruction that requests the task control module 109 to register its task (S802). At this time, the secure application 802 notifies its application name and ID, and identification information indicating that it is a secure application.

The task control module 109 makes registration to the task management table 609 based on the notification sent from the secure application 802. And, in order for the secure application 802 that has been instructed to newly activate to operate in preference to the secure application 502 now operating, the task control module 109 outputs an instruction on temporary halt to the operating secure application 502 and also notifies the application name, ID, and identification information of the application to run next (S803).

The secure application 502 determines whether the application is a secure application or a normal application based on the application name, ID, and identification information sent from the task control module 109.

If the secure application 502 determines that the application to run next is a secure application 802, the secure application 502 does not instruct deletion of display, modification such as shading and iconization (minimization), or deletion of objects saved in the object saving memory 110 to the image display formation module 104 and the pasted object management module 102 (S950 of FIG. 9D). And the secure application 502 does not instruct deletion of registered object to the pasted object management module 102 (S951 of FIG. 9C), and notifies the task control module 109 that it is ready to transition to suspended state (S804, and S952 of FIG. 9D).

In response to the notification from the secure application 502, the task control module 109 puts the secure application 502 into suspended state and switches the task of the secure application 802 which is to be newly activated to active (i.e., running state) (S953 of FIG. 9D).

Subsequently, the user can operate the secure application 802, but screen display associated with the secure application 502 is not minimized and the task control module 109 can allow the secure application 502 to suspend still being displayed on the CRT 107.

Figure 1E:
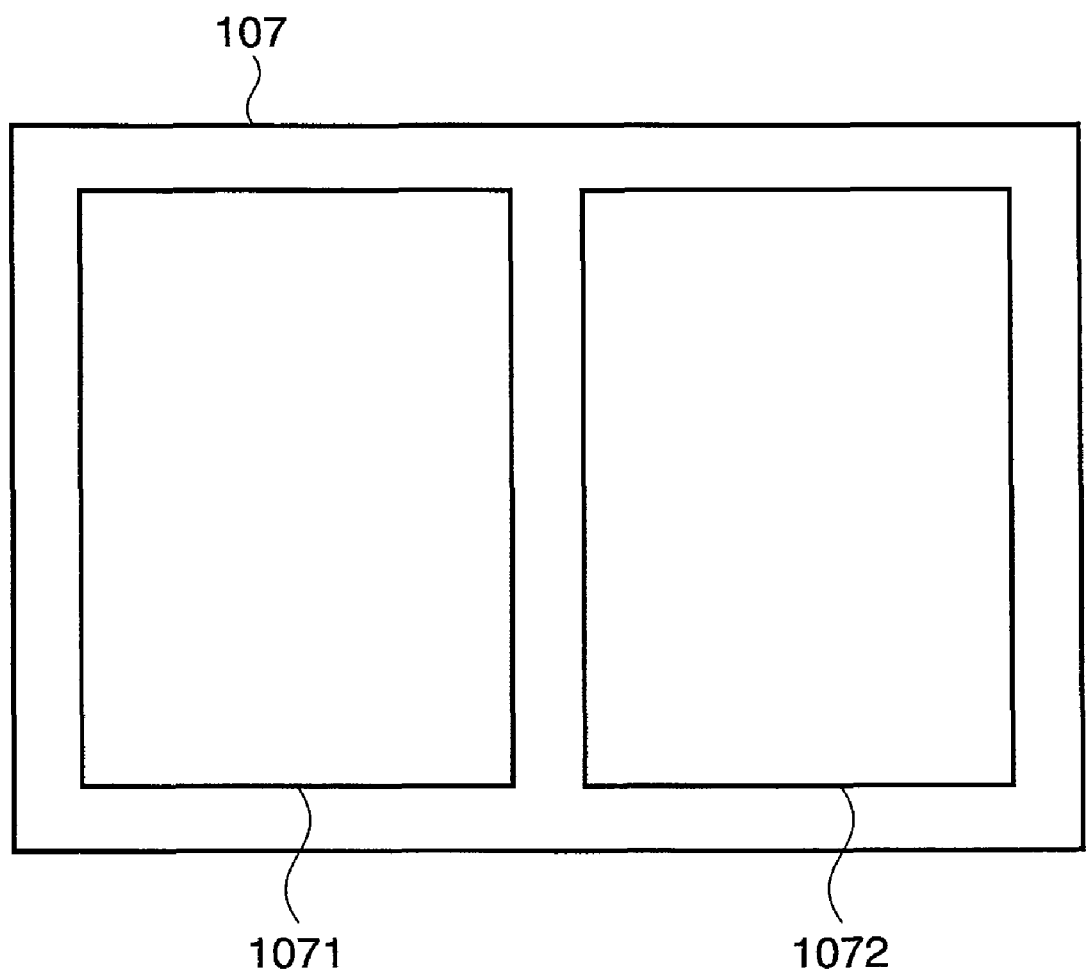
FIG. 1E shows a state in which screen display for a suspended secure application and that for an active secure application are displayed on a CRT concurrently.

The secure application 502 that transitions from running state to suspended state and the secure application 802 that is newly activated to enter running state can share objects saved in the object saving memory 110 or secure data saved on the security management server 115. Further, the display screen for the secure application 502 can be referenced from the secure application 802. Screens for two applications can be displayed concurrently on the screen of the CRT 107 as long as both of them are secure applications (502 and 802) (1071 of FIG. 1E shows the screen display for the secure application 502 and 1072 shows that for the secure application 802). Thus, the user can perform operation such as editing one document while seeing another business form screen with document security maintained, which provides enhanced convenience for the user.

Here, when one secure application 802 is running and one secure application 502 is suspended, screen display for the secure application 502 will be shown on the CRT 107 even though the secure application 502 is suspended. If another normal application is further activated subsequently, information on the application's name and ID is notified to the secure applications 502 and 802 by the task control module 109 as described earlier with FIG. 7.

In response to the notification, the secure applications 502 and 802 each instruct modification such as iconization (minimization) of screen display or shaded display to the image display formation module 104 prior to activation of the normal application (this modification corresponds to step S704 of FIG. 7), and instruct the pasted object management module 102 to delete objects registered in the object saving memory 110 (this deletion corresponds to step S705 of FIG. 7).

After outputting the instruction to delete objects registered in the object saving memory 110, the secure applications 502 and 802 notify the task control module 109 that they are ready to transition to suspended state.

In response to the notification from the secure applications 502 and 802, the task control module 109 places the secure application 502 and 802 into suspended state and switches the task of the normal application that is to be activated newly to running state.

The user can operate the normal application that was activated subsequently, but cannot reference the screen for the secure application 802 that was running previously and that for the secure application 502 that was in suspended state due to application of shading or iconization (minimization). In addition, since all objects saved in the object saving memory 110 and the like have been deleted, the user cannot reference them from the screen of the normal application newly activated.

Although the description of process with respect to FIGS. 8 and 9D has referred to termination process when a secure application is newly activated as an example, the same process can be applied to a case where the secure application 802 is managed in suspended state by the task management module 109 as a program that will transition to running state next when the secure application 502 transitions to suspended state.

With the above-described process, it is possible to prevent reference, copy, or printing of information that is based on the secure applications 502 and 802 and ensure confidentiality preservation for secure data.

Other Embodiments

It goes without saying that the object of the invention may also be accomplished by supplying a system or an apparatus with a storage medium (or a recording medium) in which a program code of software which realizes the functions of the above-described embodiment is stored, and causing a computer (or CPU or MPU) of the system or apparatus to read out and executed the program code stored in the storage medium.

In this case, the program code itself read out from the storage medium realizes the function of the embodiment, and the storage medium in which the program code is stored constitutes the present invention. Further, it is to be understood that the functions of the embodiment may be accomplished not only by executing the program code read out by a computer, but by causing an OS (operating system) and the like operating on the computer to perform some or all of actual operations based on instructions of the program code.

Further, it is to be understood that the function of the embodiment may be accomplished by writing the program code read out from the storage medium into memory provided in an expansion board inserted into a computer or memory provided in an expansion unit connected to the computer and then causing a CPU and the like provided in the expansion board or the expansion unit to perform some or all of actual operations based on instructions of the program code.

While the embodiment of the invention has been described in detail, the present invention may be implemented as a system, apparatus, method, program, or a storage medium, and specifically, may be applied to a system that consists of a plurality of devices or an apparatus that consists of one device.

The present invention may also be realized by supplying the program modules of software that realize the functions of the embodiment described above (i.e., program modules corresponding to processes shown in FIGS. 1B, 4A, 4B to 8, 9A-1-9A-3 to 9D) directly or remotely to a system or an apparatus and reading out and executing the program code by a computer in the system and the apparatus.

Accordingly, a program code that is installed to the computer for realizing the functions/operations of the invention also realizes the present invention. That is, the invention also includes the computer program itself for realizing the functions/operations of the invention.

In that case, the program code may take the form of an object code, a program that is executed by an interpreter, or script data supplied to an OS as long as it has program functions.

Examples of the storage medium for supplying the program include a floppy (a registered trademark) disk, hard disk, optical disk, magneto-optical disk, MO, CD-ROM, CD-R, CD-RW, magnetic tape, non-volatile memory card, ROM, and DVD (DVD-ROM, DVD-R).

The program may also be supplied by connecting to a web site on the Internet using a browser on a host computer and downloading the computer program of the invention itself or a compressed file including automatic installation function from the web site to a storage medium such as a hard disk. The present invention may also be realized by dividing the program code constituting the program of the invention into a plurality of files and downloading each of the files from different web sites. That is, a WWW server that allows a plurality of users to download a program file for realizing the functions/operations of the invention on a computer is also included in the present invention.

It is also possible to encrypt the program of the invention and distribute it to users on a storage medium such as CD- ROM. And a user who satisfies predetermined conditions is allowed to download key information for decoding the encrypted program from a web site over the Internet and execute the encrypted program using the key information to install the program on a computer, thereby realizing the invention.

The functions of the above-described embodiment may be realized by a reading out and executing the program by a computer, or also by causing an OS operating on the computer to perform some or all of actual operations based on instructions of the program.

The functions of the embodiment may also be realized by writing the program read out from a storage medium into memory that is provided in an expansion board inserted to a computer or in an expansion unit connected to the computer, and a CPU provided in the expansion board or expansion unit performing some or all of actual operations based on instructions of the program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Laid-Open No. 2005-234699, filed on Aug. 12, 2005, which is hereby incorporated by reference herein in its entirety.

The invention claimed is:

1. An information processing apparatus including at least one processor for activating a plurality of programs, said information processing apparatus comprising:
   a task control unit adapted to manage executions of the plurality of programs;
   a display control unit adapted to control a screen display of a display unit that is displayed by an execution of a first program among the plurality of programs, wherein the first program is a secure application program and
   a restriction unit adapted to restrict a storage of display data corresponding to a screen whose display is controlled by said display control unit in an area that is readable by a second program among the plurality of programs, wherein the second program is not a secure application program,
   wherein when the execution of the first program is completed, said restriction unit deletes the storage of the display data corresponding to the screen whose display is controlled by said display control unit,
   wherein when new execution of other first program is notified by said task control unit while the first program is activated, said restriction unit does not delete the storage of the display data corresponding to the screen whose display is controlled by said display control unit,
   wherein when new execution of other second program is notified by said task control unit while the first program is activated, said restriction unit deletes the storage of the display data corresponding to the screen whose display is controlled by said display control unit, and
   wherein said restriction unit restricts print screen function so that a screen image that is displayed on said display unit using the first program cannot be read by the second program.

2. An information processing method for activating a plurality of programs, said information processing method, comprising:
   a task control step of managing executions of the plurality of programs;
   a display control step of controlling screen display of a display unit that is displayed by a first program executed among the plurality of programs, wherein the first program is a secure application program; and
   a restriction step of restricting storage of display data corresponding to a screen whose display is controlled by said display control step in an area that is readable by a second program among the plurality of programs, wherein the second program is not a secure application program,
   wherein when the execution of the first program is completed, said restriction step deletes the storage of the display data corresponding to the screen whose display is controlled by said display control step,
   wherein when new execution of other first program is notified by said task control step while the first program is activated, said restriction step does not delete the storage of the display data corresponding to the screen whose display is controlled by said display control step,
   wherein when new execution of other second program is notified by said task control step while the first program is activated, said restriction step deletes the storage of the display data corresponding to the screen whose display is controlled by said display control step, and
   wherein said restriction step restricts print screen function so that a screen image that is displayed on said display unit using the first program cannot be read by the second program.

3. A computer-readable storage medium having stored thereon a program for executing the method according to claim 2.

* * * * *